United States Patent
Moon et al.

(10) Patent No.: US 11,564,223 B2
(45) Date of Patent: Jan. 24, 2023

(54) METHOD AND APPARATUS FOR UPLINK COMMUNICATION IN UNLICENSED BAND

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 223 days.

(21) Appl. No.: 16/880,833

(22) Filed: May 21, 2020

(65) Prior Publication Data

US 2020/0383095 A1 Dec. 3, 2020

(30) Foreign Application Priority Data

| May 30, 2019 | (KR) | 10-2019-0064048 |
| Jul. 3, 2019 | (KR) | 10-2019-0080334 |
| Oct. 11, 2019 | (KR) | 10-2019-0126506 |
| Apr. 27, 2020 | (KR) | 10-2020-0050806 |

(51) Int. Cl.
*H04W 72/04* (2009.01)
*H04L 1/18* (2006.01)

(52) U.S. Cl.
CPC ......... *H04W 72/044* (2013.01); *H04L 1/1893* (2013.01)

(58) Field of Classification Search
None
See application file for complete search history.

(56) References Cited

U.S. PATENT DOCUMENTS

| 2017/0034850 | A1* | 2/2017 | Rico Alvarino | H04L 1/1822 |
| 2018/0317244 | A1 | 11/2018 | Um et al. | |
| 2018/0317256 | A1 | 11/2018 | Um et al. | |
| 2019/0075581 | A1 | 3/2019 | Salem et al. | |
| 2019/0132862 | A1* | 5/2019 | Jeon | H04L 5/0064 |
| 2019/0159253 | A1 | 5/2019 | Koorapaty et al. | |
| 2019/0159255 | A1 | 5/2019 | Zheng et al. | |
| 2019/0174542 | A1 | 6/2019 | Lei et al. | |
| 2019/0208524 | A1 | 7/2019 | Dinan | |

(Continued)

*Primary Examiner* — Steve R Young
(74) *Attorney, Agent, or Firm* — Rabin & Berdo, P.C.

(57) ABSTRACT

An operation method of a terminal may comprise receiving information on one CG configuration for uplink transmission from a base station; obtaining common time domain resource allocation information for combinations of RB sets based on the information on the one CG configuration; obtaining frequency domain resource allocation information for each of the combinations of the RB sets based on the information on the one CG configuration; determining a number of PRBs to which an uplink channel is mapped based on the frequency domain resource allocation information corresponding to one combination of the combinations; determining a TBS based on the common time domain resource allocation information and the number of PRBs; and transmitting a TB having the TBS to the base station within the one combination through the uplink channel according to the common time domain resource allocation information and the frequency domain resource allocation information.

18 Claims, 10 Drawing Sheets

(56) References Cited

U.S. PATENT DOCUMENTS

| | | | |
|---|---|---|---|
| 2019/0208540 A1 | 7/2019 | Kim et al. | |
| 2019/0230706 A1 | 7/2019 | Li et al. | |
| 2019/0313437 A1* | 10/2019 | Jung | H04W 72/0453 |
| 2019/0349973 A1* | 11/2019 | Yang | H04W 72/1284 |
| 2019/0356451 A1* | 11/2019 | Zhang | H04B 17/327 |
| 2020/0007296 A1* | 1/2020 | Papasakellariou | H04L 5/0042 |
| 2020/0221310 A1* | 7/2020 | Babaei | H04L 5/001 |
| 2021/0337538 A1* | 10/2021 | Li | H04L 1/1664 |
| 2022/0069957 A1* | 3/2022 | Lee | H04W 72/042 |
| 2022/0173867 A1* | 6/2022 | Nogami | H04L 5/001 |
| 2022/0174699 A1* | 6/2022 | El Hamss | H04W 72/1268 |
| 2022/0217543 A1* | 7/2022 | Murayama | H04L 5/0044 |

* cited by examiner

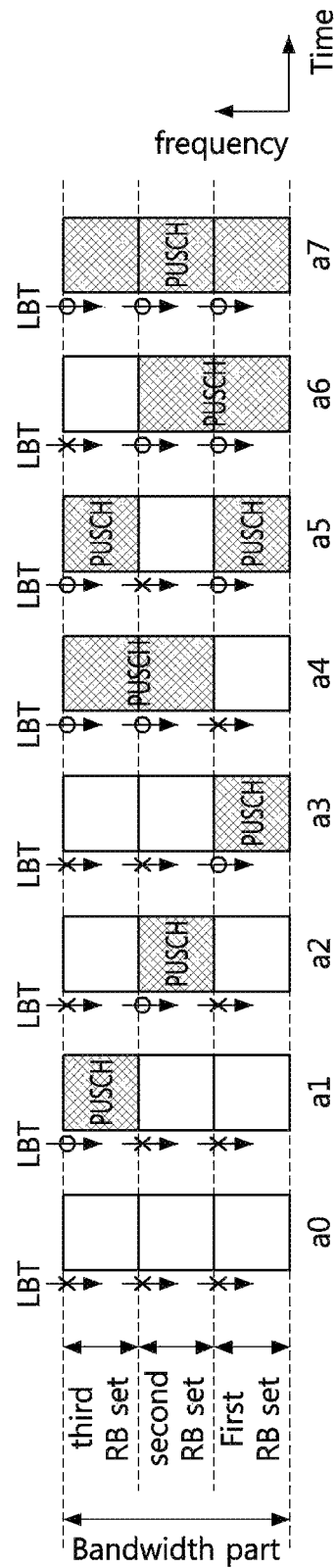
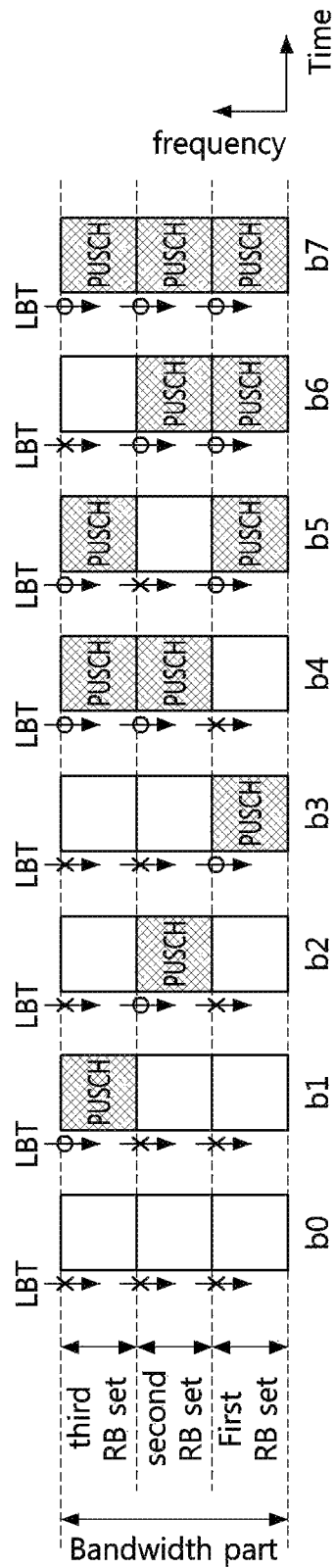
FIG. 5A
FIG. 5B

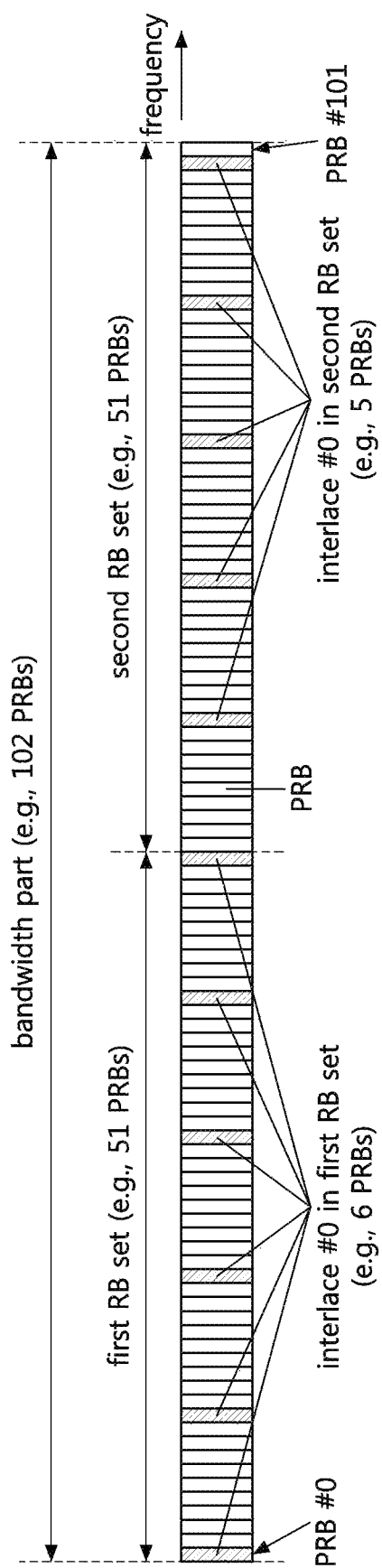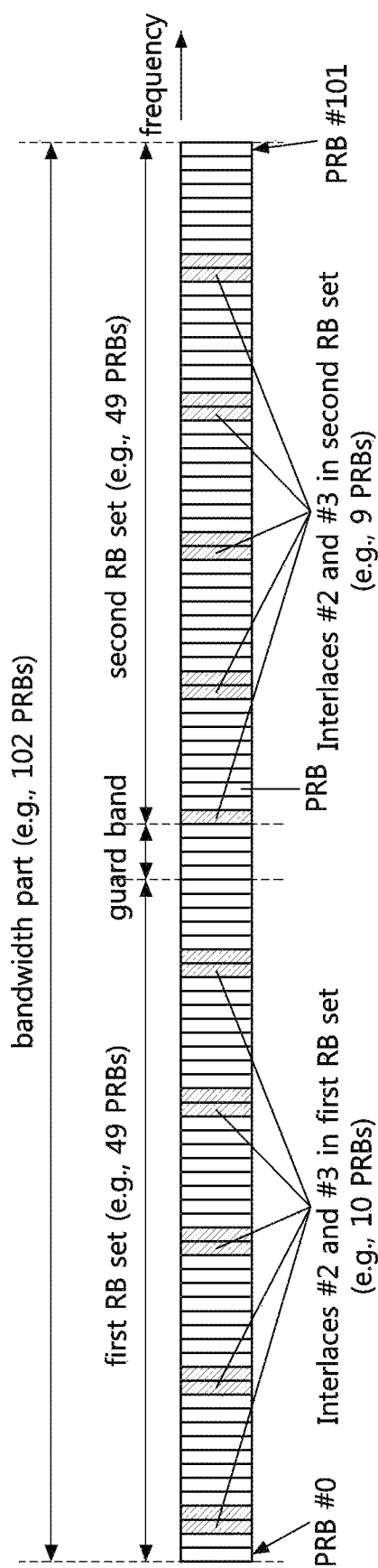

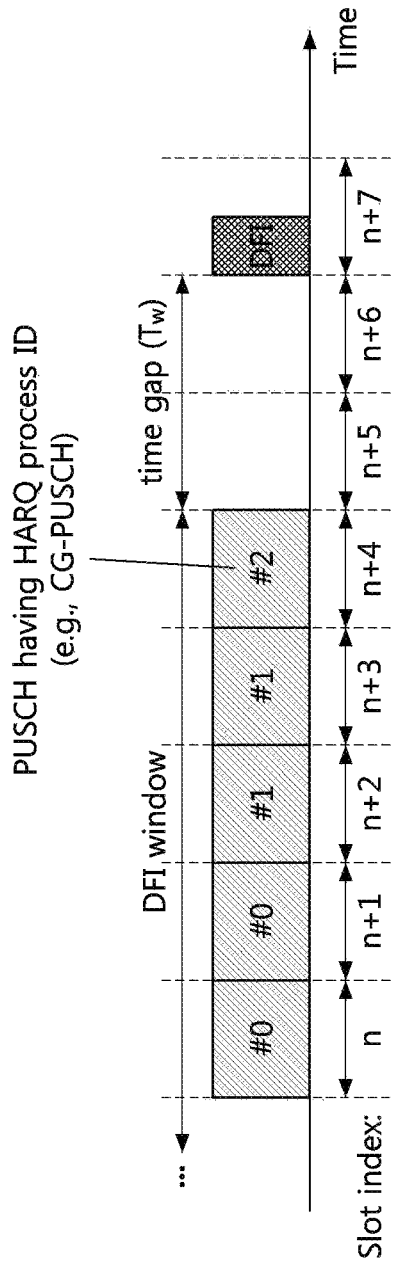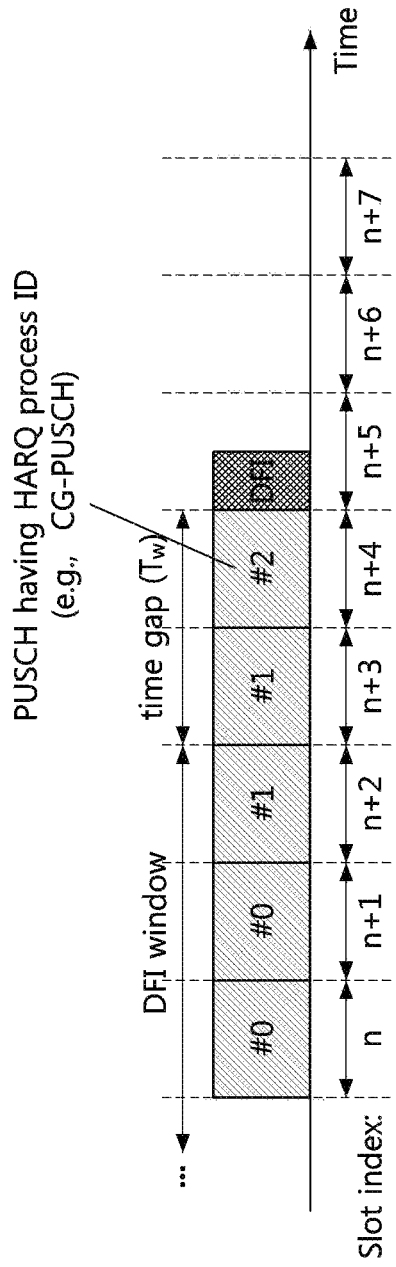

METHOD AND APPARATUS FOR UPLINK COMMUNICATION IN UNLICENSED BAND

CROSS-REFERENCE TO RELATED APPLICATIONS

This application claims priority to Korean Patent Applications No. 10-2019-0064048 filed on May 30, 2019, No. 10-2019-0080334 filed on Jul. 3, 2019, No. 10-2019-0126506 filed on Oct. 11, 2019, and No. 10-2020-0050806 filed on Apr. 27, 2020 with the Korean Intellectual Property Office (KIPO), the entire contents of which are hereby incorporated by reference.

BACKGROUND

1. Technical Field

The present disclosure relates generally to techniques for transmitting and receiving signals in a communication system, and more specifically, to techniques for transmitting and receiving uplink signals in an unlicensed band.

2. Related Art

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like. Communication technologies for satisfying the requirements of eMBB, URLLC, and mMTC are required.

Meanwhile, communications through an unlicensed band may be used to process rapidly increasing wireless data. Currently, communication technologies that use unlicensed bands include LTE-Unlicensed (LTE-U), Licensed-Assisted-Access (LAA), MultiFire, and the like. In addition to the existing functions, the NR communication system can support a standalone mode that independently operates only in an unlicensed band. However, an initial access procedure, a signal transmission procedure, a channel access scheme suitable for a flexible frame structure, a wideband carrier operation, and the like in the unlicensed band are not yet clearly defined. In this reason, operations of a base station and terminals for the above-described technical elements need to be clearly defined.

SUMMARY

Accordingly, exemplary embodiments of the present disclosure provide methods and apparatuses for transmitting and receiving uplink signals in an unlicensed band.

An operation method of a terminal, according to a first exemplary embodiment of the present disclosure for achieving the above-described objective, may comprise receiving information on one configured grant (CG) configuration for uplink transmission from a base station; obtaining common time domain resource allocation information for combinations of resource block (RB) sets based on the information on the one CG configuration; obtaining frequency domain resource allocation information for each of the combinations of the RB sets based on the information on the one CG configuration; determining a number of physical resource blocks (PRBs) to which an uplink channel is mapped based on the frequency domain resource allocation information corresponding to one combination of the combinations; determining a transport block size (TBS) based on the common time domain resource allocation information and the number of PRBs; and transmitting a transport block (TB) having the TBS to the base station within the one combination through the uplink channel according to the common time domain resource allocation information and the frequency domain resource allocation information.

The RB sets may be located within a same bandwidth part.

The frequency domain resource allocation information may include information indicating one or more interlaces applied to each of the combinations.

Each of the RB sets may include consecutive RBs in frequency domain, and when the RB sets include a first RB set and a second RB set, the combinations may be a combination consisting of the first RB set, a combination consisting of the second RB set, and a combination consisting of the first RB set and the second RB set.

A guard band is located between the RB sets, and the guard band disposed between RB sets constituting the one combination may be used for transmission of the uplink channel.

The one combination may be determined based on a combination of one or more RB sets in which listen before talk (LBT) operations performed by the terminal are successful.

The RB sets may be one or more RB sets among all RB sets constituting a same bandwidth part, and the information on the one CG configuration may further include information indicating the one or more RB sets or combinations of the one or more RB sets.

The information on the one CG configuration may further include information indicating a set of redundancy versions (RVs), and the TB may be repeatedly transmitted according to the set of RVs.

The operation method may further comprise receiving hybrid automatic repeat request (HARQ)-acknowledgement (ACK) information from the base station, wherein the HARQ-ACK information may include a reception response for the TB transmitted within a time window, and the time window may be determined based on a time point when the HARQ-ACK information is received.

An operation method of a base station, according to a second exemplary embodiment of the present disclosure for achieving the above-described objective, may comprise generating frequency domain resource allocation information for each of combinations of resource block (RB) sets; transmitting information on one configured grant (CG) configuration including the frequency domain resource allocation information to a terminal; and receiving a transport block (TB) from the terminal through an uplink channel according to the frequency domain resource allocation information, wherein the frequency domain resource allocation information includes information indicating one or more interlaces applied to each of the combinations, and a size of the TB is determined based on a number of physical resource blocks (PRBs) corresponding to the one or more interlaces.

The RB sets may be located within a same bandwidth part, each of the RB sets may include consecutive RBs in frequency domain, and when the RB sets include a first RB set and a second RB set, the combinations may be a combination consisting of the first RB set, a combination consisting of the second RB set, and a combination consisting of the first RB set and the second RB set.

The RB sets may be one or more RB sets among all RB sets constituting a same bandwidth part, and the information on the one CG configuration may further include information indicating the one or more RB sets or combinations of the one or more RB sets.

The information on the one CG configuration may further include common time domain resource allocation information indicating a set of redundancy versions (RVs), the TB may be repeatedly transmitted by the terminal according to the set of RVs, and the common time domain resource allocation information may be configured for the combinations of the RB sets.

The operation method may further comprise transmitting hybrid automatic repeat request (HARQ)-acknowledgement (ACK) information to the terminal, wherein the HARQ-ACK information may include a reception response for the TB received within a time window, and the time window may be determined based on a time point when the HARQ-ACK is received at the terminal.

A terminal, according to a third exemplary embodiment of the present disclosure for achieving the above-described objective, may comprise a processor; a memory electronically communicating with the processor; and instructions stored in the memory, wherein when the instructions are executed by the processor, the instructions cause the terminal to: receive information on one configured grant (CG) configuration for uplink transmission from a base station; obtain common time domain resource allocation information for combinations of resource block (RB) sets based on the information on the one CG configuration; obtain frequency domain resource allocation information for each of the combinations of the RB sets based on the information on the one CG configuration; determine a number of physical resource blocks (PRBs) to which an uplink channel is mapped based on the frequency domain resource allocation information corresponding to one combination of the combinations; determine a transport block size (TBS) based on the common time domain resource allocation information and the number of PRBs; and transmit a transport block (TB) having the TBS to the base station within the one combination through the uplink channel according to the common time domain resource allocation information and the frequency domain resource allocation information.

The frequency domain resource allocation information may include information indicating one or more interlaces applied to each of the combinations.

The RB sets may be located within a same bandwidth part, each of the RB sets may include consecutive RBs in frequency domain, and when the RB sets include a first RB set and a second RB set, the combinations may be a combination consisting of the first RB set, a combination consisting of the second RB set, and a combination consisting of the first RB set and the second RB set.

The RB sets may be one or more RB sets among all RB sets constituting a same bandwidth part, and the information on the one CG configuration may further include information indicating the one or more RB sets or combinations of the one or more RB sets.

The information on the one CG configuration may further include information indicating a set of redundancy versions (RVs), the TB may be repeatedly transmitted according to the set of RVs, and the common time domain resource allocation information may be configured for the combinations of the RB sets.

The instructions may further cause the terminal to receive hybrid automatic repeat request (HARQ)-acknowledgement (ACK) information from the base station, wherein the HARQ-ACK information may include a reception response for the TB transmitted within a time window, and the time window may be determined based on a time point when the HARQ-ACK information is received.

According to the exemplary embodiments of the present disclosure, the terminal may receive configuration information of configured grant (CG) resources from the base station. The configuration information of the CG resources may include frequency domain resource allocation information and time domain resource allocation information. The frequency domain resource allocation information may include information of an interlace applied to each of resource block (RB) combinations configured in the terminal. The terminal may identify the number of physical resource blocks (PRBs) to which an uplink channel is mapped based on the information of the interlace, and may determine a transport block size (TBS) based on the number of PRBs.

Further, the time domain resource allocation information may include a redundancy version (RV) pattern. The terminal may repeatedly transmit a transport block (TB) according to the RV pattern. The terminal may receive hybrid automatic repeat request (HARQ)-acknowledgement (ACK) information for the TB from the base station, and determine that the HARQ-ACK information includes reception response(s) for TB(s) transmitted within a time window. According to the above-described operations, unlicensed band communication can be efficiently performed, and the performance of the communication system can be improved.

BRIEF DESCRIPTION OF DRAWINGS

FIG. 5A is a conceptual diagram illustrating a first exemplary embodiment of a PUSCH transmission method according to a combination of RB set(s).

FIG. 5B is a conceptual diagram illustrating a second exemplary embodiment of a PUSCH transmission method according to a combination of RB set(s).

FIG. 8 is a conceptual diagram illustrating a first exemplary embodiment of a method for allocating a PUSCH resource according to Method 120.

FIG. 9 is a conceptual diagram illustrating a second exemplary embodiment of a method for allocating a PUSCH resource according to Method 120.

FIG. 14A is a conceptual diagram illustrating a first exemplary embodiment of a method for configuring a DFI window.

FIG. 14B is a conceptual diagram illustrating a second exemplary embodiment of a method for configuring a DFI window.

DETAILED DESCRIPTION OF THE EMBODIMENTS

Figure 1:
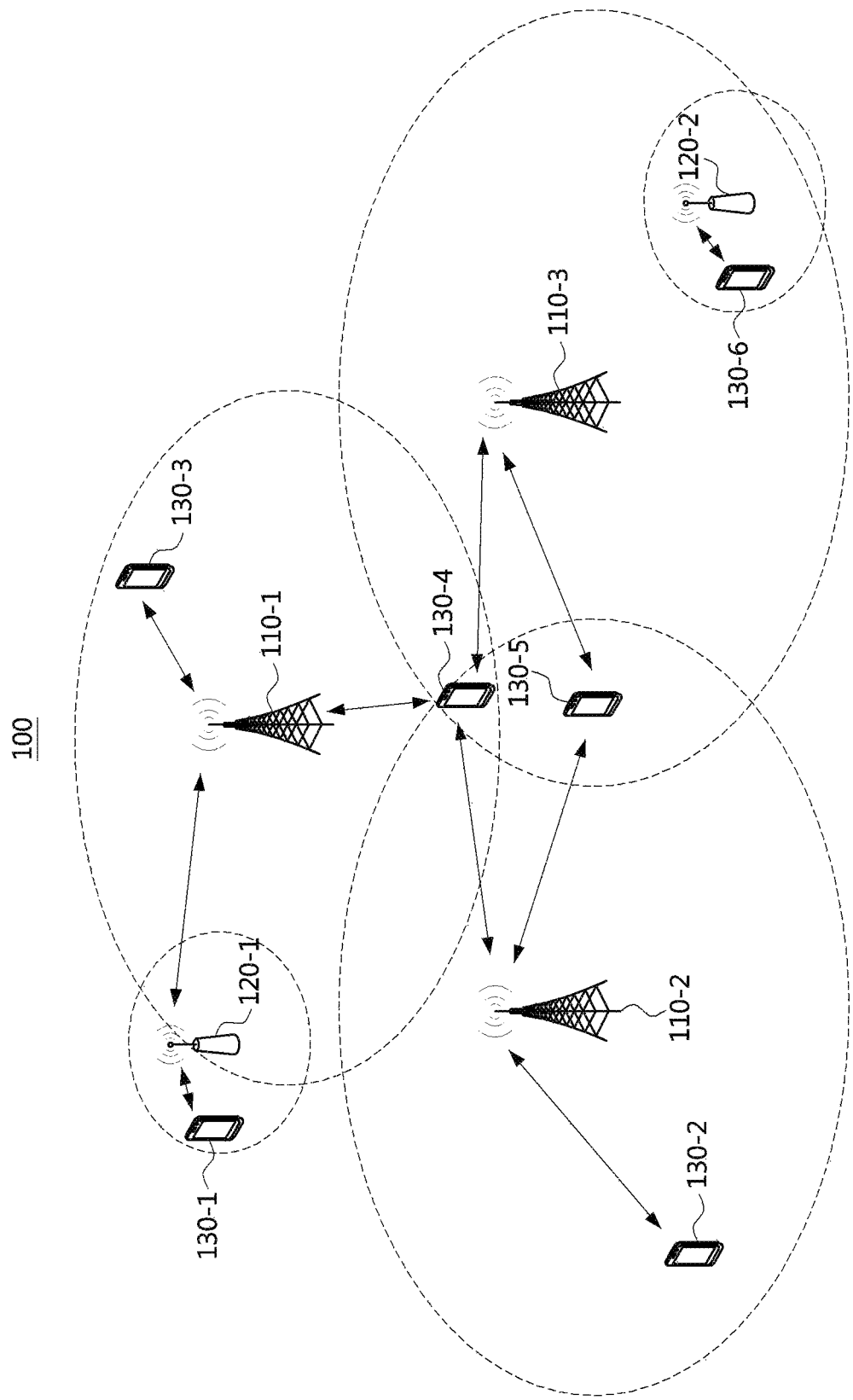
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the $3^{rd}$ generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
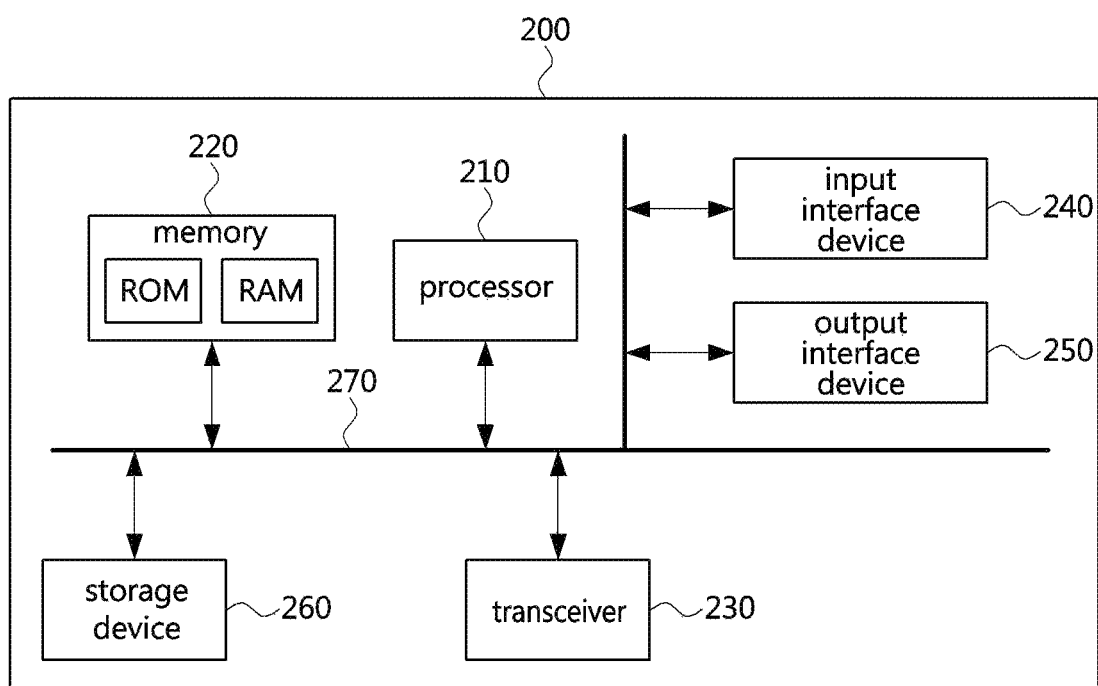
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system (e.g., NR communication system) may support one or more services among an enhanced mobile broadband (eMBB) service, an ultra-reliable and low-latency communication (URLLC) service, and a massive machine type communication (mMTC) service. The communications may be performed to satisfy technical requirements of the services in the communication system. In the URLLC service, the requirement of the transmission reliability may be 1-105, and the requirement of the uplink and downlink user plane latency may be 0.5 ms.

In the following exemplary embodiments, a channel access method, a method of transmitting and receiving signals, etc. in a communication system supporting an unlicensed band will be described. The exemplary embodiments below may also be applied to other communication systems (e.g., LTE communication system) as well as the NR communication system. The unlicensed band may refer to a shared band.

The NR communication system may support a wider system bandwidth (e.g., carrier bandwidth) than a system bandwidth provided by the LTE communication system in order to efficiently use a wide frequency band. For example, the maximum system bandwidth supported by the LTE communication system may be 20 MHz. On the other hand, the NR communication system may support a carrier bandwidth of up to 100 MHz in the frequency band of 6 GHz or below, and support a carrier bandwidth of up to 400 MHz in the frequency band of 6 GHz or above.

A numerology applied to physical signals and channels in the communication system (e.g., NR communication system) may vary. The numerology may vary to satisfy various technical requirements of the communication system. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have a power of two multiplication relationship, and the CP length may be scaled at the same ratio as the OFDM symbol length. Depending on a frequency band in which the communication system operates, some of the numerologies of Table 1 may be supported. When the subcarrier spacing is 60 kHz, an extended CP may be additionally supported.

In the following description, a frame structure in the communication system will be described. In the time domain, a building block may be a subframe, a slot, and/or a minislot. The subframe may be used as a transmission unit, and the length of the subframe may have a fixed value (e.g., 1 ms) regardless of the subcarrier spacing. When a normal CP is used, the slot may comprise consecutive symbols (e.g., 14 OFDM symbols). The length of the slot may be variable differently from the length of the subframe, and may be inversely proportional to the subcarrier spacing. The slot may be used as a scheduling unit and may be used as a configuration unit of scheduling and hybrid automatic repeat request (HARQ) timing. Each of a scheduling interval and a transmission duration may not coincide with the length of the slot.

The base station may schedule a data channel (e.g., physical downlink shared channel (PDSCH), physical uplink shared channel (PUSCH), or physical sidelink shared channel (PSSCH)) by using a part or all of symbols constituting a slot. Alternatively, the base station may schedule a data channel using a plurality of slots. A minislot may be used as a transmission unit, and the length of the minislot may be configured to be shorter than the length of the slot. For example, the minislot may be a scheduling or transmission unit having a length shorter than that of a slot. A slot having a length shorter than the length of the conventional slot may be referred to as a 'minislot' in the communication system. The minislot-based scheduling operation may be used for transmission of a partial slot, URLLC data transmission, analog beamforming-based multi-user scheduling, etc. in an unlicensed band or a band where the NR communication system and the LTE communication system coexist. In the NR communication system, a physical downlink control channel (PDCCH) monitoring periodicity and/or a duration of a data channel may be configured to be shorter than the conventional slot, so that the minislot-based transmission can be supported.

In the frequency domain of the NR communication system, a building block may be a physical resource block (PRB). One PRB may comprise consecutive subcarriers (e.g., 12 subcarriers) regardless of the numerology. Thus, a bandwidth occupied by one PRB may be proportional to the subcarrier spacing of the numerology. The PRB may be used as a resource allocation unit of a control channel and/or a data channel in a data channel domain. The minimum resource allocation unit of the downlink control channel may be a control channel element (CCE). One CCE may include one or more PRBs. Resource allocation for a data channel may be performed in unit of a PRB or a resource block group (RBG). One RBG may include one or more consecutive PRBs.

In addition, in the communication system (e.g., LTE communication system), the PRB may be used as a resource allocation unit for both of the frequency domain and the time domain. For example, one PRB may refer to a physical resource consisting of 12 consecutive subcarriers and 7

TABLE 1

| Subcarrier spacing | 15 kHz | 30 kHz | 60 kHz | 120 kHz | 240 kHz |
|---|---|---|---|---|---|
| OFDM symbol length [μs] | 66.7 | 33.3 | 16.7 | 8.3 | 4.2 |
| CP length [μs] | 4.76 | 2.38 | 1.19 | 0.60 | 0.30 |
| Number of OFDM symbols within 1 ms | 14 | 28 | 56 | 112 | 224 | consecutive symbols. Alternatively, one PRB may mean a physical resource composed of 12 consecutive subcarriers and 6 consecutive symbols.

A slot (e.g., slot format) may be composed of a combination of one or more of a downlink period, a flexible period (or unknown period), and an uplink period. Each of the downlink period, the flexible period, and the uplink period may be comprised of one or more consecutive symbols. The flexible period may be located between the downlink period and the uplink period, between a first downlink period and a second downlink period, or between a first uplink period and a second uplink period. When the flexible period is inserted between the downlink period and the uplink period, the flexible period may be used as a guard period.

One slot may include a plurality of flexible periods. Alternatively, one slot may not include a flexible period. The terminal may perform a predefined operation or an operation configured by the base station semi-statically or periodically (e.g., PDCCH monitoring operation, synchronization signal/physical broadcast channel (SS/PBCH) block reception and measurement operation, channel state information-reference signal (CSI-RS) reception and measurement operation, downlink semi-persistent scheduling (SPS) PDSCH reception operation, sounding reference signal (SRS) transmission operation, physical random access channel (PRACH) transmission operation, periodically-configured PUCCH transmission operation, PUSCH transmission operation according to a configured grant, or the like) in a flexible symbol until the corresponding flexible period is overridden to be a downlink symbol or an uplink symbol. Alternatively, the terminal may not perform any operation in the corresponding flexible symbol until the corresponding flexible period is overridden to be a downlink symbol or an uplink symbol.

The slot format may be configured semi-statically by higher layer signaling (e.g. radio resource control (RRC) signaling). Information indicating a semi-static slot format may be included in system information, and the semi-static slot format may be configured in a cell-specific manner. For example, a cell-specific slot format may be configured through an RRC parameter 'TDD-UL-DL-ConfigCommon'. In addition, the slot format may be additionally configured for each terminal through terminal-specific (i.e., UE-specific) higher layer signaling (e.g., RRC signaling). For example, a UE-specific slot format may be configured through an RRC parameter 'TDD-UL-DL-ConfigDedicated'. A flexible symbol of the slot format configured in the cell-specific manner may be overridden by the terminal-specific higher layer signaling to a downlink symbol or an uplink symbol. Also, the slot format may be dynamically indicated by a slot format indicator (SFI) included in downlink control information (DCI).

The terminal may perform downlink operations, uplink operations, and sidelink operations in a bandwidth part. The bandwidth part may be defined as a set of consecutive PRBs having a specific numerology in the frequency domain. Only one numerology may be used for transmission of a control channel or a data channel in one bandwidth part. The terminal performing an initial access procedure may obtain configuration information of an initial bandwidth part from the base station through system information. A terminal operating in an RRC connected state may obtain the configuration information of the bandwidth part from the base station through terminal-specific higher layer signaling.

The configuration information of the bandwidth part may include a numerology (e.g., a subcarrier spacing and a CP length) applied to the bandwidth part. Also, the configuration information of the bandwidth part may further include information indicating a position of a starting PRB of the bandwidth part and information indicating the number of PRBs constituting the bandwidth part. At least one bandwidth part among the bandwidth part(s) configured in the terminal may be activated. For example, within one carrier, one uplink bandwidth part and one downlink bandwidth part may be activated respectively. In a time division duplex (TDD) based communication system, a pair of one uplink bandwidth part and one downlink bandwidth part may be activated. The base station may configure a plurality of bandwidth parts to the terminal within one carrier, and may switch the active bandwidth part of the terminal.

In the exemplary embodiments, the expression that a certain frequency band (e.g., carrier, bandwidth part, a resource block (RB) set, guard band, etc.) is activated may mean that the certain frequency band is in a state in which a base station or a terminal can transmit or receive a signal by using the corresponding frequency band. In addition, an expression that a certain frequency band is activated may mean that the certain frequency band is in a state in which a radio frequency (RF) filter (e.g., band pass filter) of a transceiver is operating including the frequency band. In the exemplary embodiments, the RB set may be composed of consecutive RB(s). The RB set may be referred to also as a 'listen before talk (LBT) subband'.

The minimum resource unit constituting a PDCCH may be a resource element group (REG). The REG may be composed of one PRB (e.g., 12 subcarriers) in the frequency domain and one OFDM symbol in the time domain. Thus, one REG may include 12 resource elements (REs). A demodulation reference signal (DMRS) for demodulating the PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. The NR communication system may support CCE aggregation levels 1, 2, 4, 8, 16, and the like, and one CCE may consist of six REGs.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting one CORESET may be continuous or discontinuous in the frequency domain. One DCI (e.g., one PDCCH) may be transmitted within one CORESET. A plurality of CORESETs may be configured with respect to a cell and a terminal, and the plurality of CORESETs may overlap in time-frequency resources.

The CORESET may be configured in the terminal by a PBCH (e.g., system information transmitted through the PBCH). The identifier (ID) of the CORESET configured by the PBCH may be 0. That is, the CORESET configured by the PBCH may be referred to as a CORESET #0. The terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured in the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured in the terminal by terminal-specific higher layer signaling (e.g., RRC signaling).

In each downlink bandwidth part, one or more CORESETs may be configured for the terminal. Here, the expression that the CORESET is configured in the bandwidth part may mean that the CORESET is logically associated with the bandwidth part and the terminal monitors the corresponding CORESET in the bandwidth part. The initial downlink active bandwidth part may include the CORESET #0 and may be associated with the CORESET #0. The CORESET #0 having a quasi-co-location (QCL) relation with an SS/PBCH block may be configured for the terminal in a primary cell (PCell), a secondary cell (SCell), and a primary secondary cell (PSCell). In the secondary cell (SCell), the CORESET #0 may not be configured for the terminal.

A search space may be a set of candidate resource regions through which PDCCHs can be transmitted. The terminal may perform a blind decoding on each of the PDCCH candidates within a predefined search space. The terminal may determine whether a PDCCH is transmitted to itself by performing a cyclic redundancy check (CRC) on a result of the blind decoding. When it is determined that a PDCCH is a PDCCH for the terminal itself, the terminal may receive the PDCCH.

A PDCCH candidate constituting the search space may consist of CCEs selected by a predefined hash function within an occasion of the CORESET or the search space. The search space may be defined and configured for each CCE aggregation level. In this case, a set of search spaces for all CCE aggregation levels may be referred to as a 'search space set'. In the exemplary embodiments, 'search space' may mean 'search space set', and 'search space set' may mean 'search space'.

A search space set may be logically associated with one CORESET. One CORESET may be logically associated with one or more search space sets. A common search space set configured through the PBCH may be used to monitor a DCI scheduling a PDSCH for transmission of the SIB1. The ID of the common search space set configured through the PBCH may be set to 0. That is, the common search space set configured through the PBCH may be defined as a type 0 PDCCH common search space set or a search space set #0. The search space set #0 may be logically associated with the CORESET #0.

The search space set may be classified into a common search space set and a terminal-specific (i.e., UE-specific) search space set. A common DCI may be transmitted in the common search space set, and a terminal-specific DCI may be transmitted in the terminal-specific search space set. Considering degree of freedom in scheduling and/or fallback transmission, a terminal-specific DCI may also be transmitted in the common search space set. For example, the common DCI may include resource allocation information of a PDSCH for transmission of system information, paging, power control commands, slot format indicator (SFI), pre-emption indicator, and the like. The terminal-specific DCI may include PDSCH resource allocation information, PUSCH resource allocation information, and the like. A plurality of DCI formats may be defined according to the payload and the size of the DCI, the type of radio network temporary identifier (RNTI), or the like.

In the exemplary embodiments below, the common search space may be referred to as 'CSS', and the common search space set may be referred to as 'CSS set'. Also, in the exemplary embodiments below, the terminal-specific search space may be referred to as 'USS', and the terminal-specific search space set may be referred to as 'USS set'.

In the exemplary embodiments, 'signaling' may refer to a combination of one or more among physical layer (PHY) signaling (e.g., DCI), medium access control (MAC) signaling (e.g., MAC control element (CE)), RRC signaling (e.g., a master information block (MIB), a system information block (SIB), cell-specific RRC signaling, terminal-specific RRC signaling, etc.), and the like. In addition, the 'signaling (or configuration)' may mean both of signaling (or configuration) by an explicit scheme and signaling (or configuration) by an implicit scheme. In the exemplary embodiments below, 'signal' may be used as a meaning including a 'physical layer signal' and a 'physical layer channel'. For example, a downlink signal may include a downlink physical layer signal (e.g., DM-RS, CSI-RS, phase tracking-RS (PT-RS), SS/PBCH block, etc.) and a downlink physical layer channel (e.g., PDCCH, PDSCH, etc.). An uplink signal may include an uplink physical layer signal (e.g., DM-RS, SRS, PT-RS, etc.) and an uplink physical layer channel (e.g., PUCCH, PUSCH, PRACH, etc.).

Exemplary embodiments of the present disclosure may be applied to various communication scenarios using an unlicensed band. For example, with assistance of a primary cell in a licensed band, a cell in the unlicensed band may be configured as a secondary cell, and a carrier in the secondary cell may be aggregated with another carrier. Alternatively, a cell in the unlicensed cell (e.g., secondary cell) and a cell in the licensed band (e.g., primary cell) may support dual connectivity operations. Accordingly, the transmission capacity can be increased. Alternatively, a cell in the unlicensed band may independently perform functions of a primary cell. Alternatively, a downlink carrier of the licensed band may be combined with an uplink carrier of the unlicensed band, and the combined carriers may perform functions as one cell. On the other hand, an uplink carrier of the licensed band may be combined with a downlink carrier of the unlicensed band, and the combined carriers may perform functions as one cell. In addition, exemplary embodiments of the present disclosure may be applied to other communication systems (e.g., communication systems supporting the licensed band) as well as communication systems supporting unlicensed bands.

In the communications of the unlicensed band, a contention-based channel access scheme may be used to satisfy spectrum regulatory conditions and coexist with existing communication nodes (e.g., Wi-Fi stations). For example, a communication node desiring to access a channel in an unlicensed band may identify a channel occupancy state by performing a clear channel assessment (CCA) operation. A transmitting node (e.g., communication node performing a transmitting operation) may determine whether a channel is in a busy or idle state based on a predefined (or preconfigured) CCA threshold. When the state of the channel is the idle state, the transmitting node may transmit a signal and/or channel in the corresponding channel. The above-described operation may be referred to as a 'listen before talk (LBT) operation'.

The LBT operation may be classified into four categories according to whether the LBT operation is performed and how it is applied. The first category (e.g., LBT category 1) may be a scheme in which the transmitting node does not perform the LBT operation. That is, when the category 1 is used, the transmitting node may transmit a signal and/or channel without performing the channel sensing operation (e.g., CCA operation). The second category (e.g., LBT category 2) may be a scheme in which the transmitting node performs the LBT operation without a random back-off operation. The second category may be referred to as a 'one-shot LBT operation'. The third category (e.g., LBT category 3) may be a scheme in which the transmitting node performs the LBT operation based on a random backoff value (e.g., random backoff counter) according to a contention window (CW) of a fixed size. The fourth category (e.g., LBT category 4) may be a scheme in which the transmitting node performs the LBT operation based on a random backoff value according to a contention window of a variable size. In the third and the fourth categories, the contention window may be extended based on the random backoff value, during which the channel sensing operation (e.g., CCA operation) is performed. The transmitting node may perform an initial channel sensing operation. The transmitting node may perform the contention window extension if the initial channel sensing operation is failed.

The LBT operation may be performed in unit of a specific frequency bundle. The frequency bundle may be referred to as 'LBT subband', 'subband', or 'resource block (RB) set'. In the following exemplary embodiments, a RB set may mean an LBT subband or a subband. Here, the LBT operation may include the above-described CCA operation.

Alternatively, the LBT operation may include 'CCA operation+transmission operation of a signal and/or channel according to the CCA operation'. The bandwidth of the RB set may vary depending on a spectrum regulation, a frequency band, a communication system, an operator, a manufacturer, etc. For example, in a band where Wi-Fi stations and 3GPP terminals coexist, the bandwidth of the RB set may be 20 MHz (or about 20 MHz). The communication node may perform the channel sensing operation and/or the data transmission operation according to the channel sensing operation in unit of 20 MHz (or about 20 MHz).

In the communication (e.g., NR communication system or LTE communication system), the RB set may be a set of contiguous RBs corresponding to about 20 MHz. In this case, the bandwidth of the set of contiguous RBs may not exceed 20 MHz. In the following exemplary embodiments, an expression that the RB set is $X_L$ MHz may mean that the bandwidth of the RB set is $X_L$ MHz or about $X_L$ MHz. Unless stated otherwise, $X_L$ may be assumed to be 20. In the following exemplary embodiments, an RB may mean a PRB constituting a bandwidth part in some cases. Alternatively, an RB may mean a common RB (CRB) or a virtual RB (VRB). In particular, when the RB is used in the sense of an RB constituting a carrier, the RB may mean a CRB constituting the carrier. In the NR communication system, the CRB may refer to an RB on a common RB grid configured in the terminal based on a 'point A'.

The point A may indicate a frequency position of the subcarrier #0 within the CRB #0. The point A may be signaled from the base station to the terminal. For example, information indicating the point A may be included in a system information block 1 (SIB1) or remaining minimum system information (RMSI), and the SIB1 or RMSI indicating the point A may be transmitted. Alternatively, the information indicating the point A may be transmitted through terminal-specific RRC signaling. A frequency range of the carrier or bandwidth part may be configured to the terminal based on the point A.

In consideration of the LBT operation described above, the bandwidth of the carrier and/or bandwidth part configured in the terminal may be configured as a multiple of $X_L$ or a value close to the multiple of $X_L$. For example, the carrier and/or bandwidth part may be configured as X MHz. Alternatively, the carrier and/or bandwidth part may be configured as a set of consecutive RBs having a bandwidth close to X MHz. Here, X may be 20, 40, 60, 80, or the like.

In the NR communication system, the carrier and/or the bandwidth part may be defined as a set of CRB(s) in a CRB grid, and the CRB(s) may correspond to PRB(s). The bandwidth part may be configured to belong to one carrier. Alternatively, the bandwidth part may be configured to include frequency regions of a plurality of carriers. When the bandwidth part includes frequency regions of a plurality of carriers, one bandwidth part may be logically associated with the plurality of carriers.

Figure 3A:
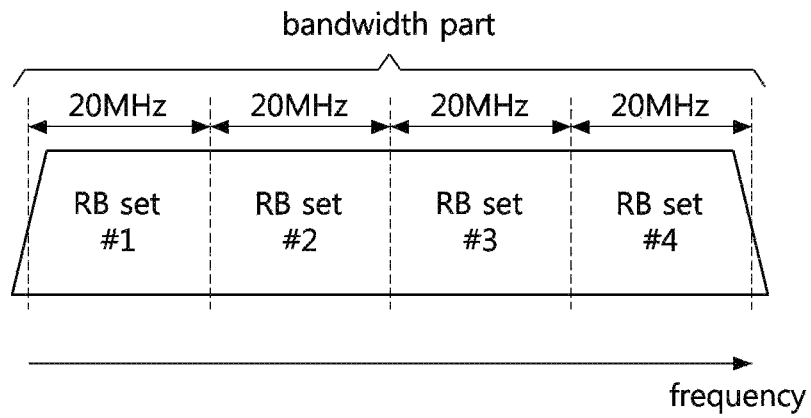
FIG. 3A is a conceptual diagram illustrating a first exemplary embodiment of bandwidth parts in a communication system.
Figure 3B:
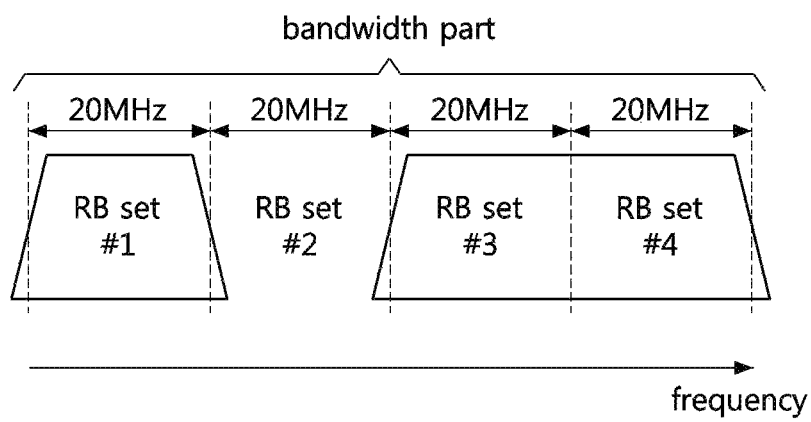
FIG. 3B is a conceptual diagram illustrating a second exemplary embodiment of bandwidth parts in a communication system.
Figure 3C:
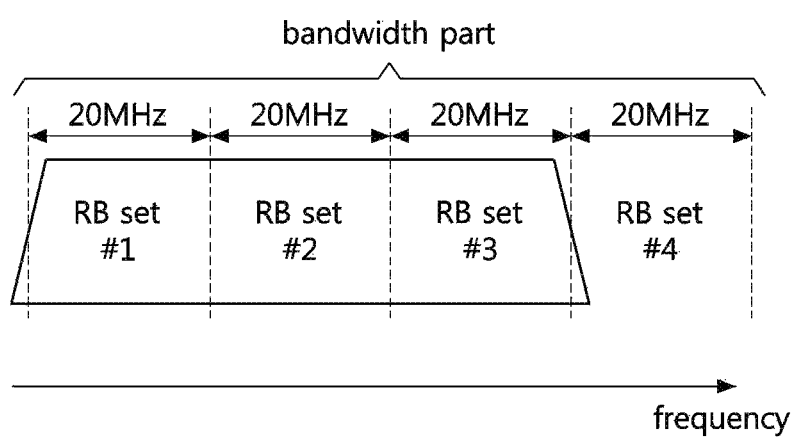
FIG. 3C is a conceptual diagram illustrating a third exemplary embodiment of bandwidth parts in a communication system.

FIG. 3A is a conceptual diagram illustrating a first exemplary embodiment of bandwidth parts in a communication system, FIG. 3B is a conceptual diagram illustrating a second exemplary embodiment of bandwidth parts in a communication system, and FIG. 3C is a conceptual diagram illustrating a third exemplary embodiment of bandwidth parts in a communication system.

Referring to FIGS. 3A to 3C, one bandwidth part may include a plurality of RB sets (e.g., a plurality of LBT subbands). A plurality of carriers may be aggregated for the terminal, and each of the aggregated carriers (or, bandwidth part corresponding to the aggregated carriers) may be composed of one or more RB sets. For example, one bandwidth part may include four RB sets, and each RB set may have a bandwidth of 20 MHz. That is, $X_L$=20. A transmitting node (e.g., base station or terminal) may perform a CCA operation on an RB set basis before transmitting a signal and/or channel. Depending on a result of the CCA operation, a channel(s) corresponding to a part of the bandwidth part or the entire bandwidth part may be occupied by the transmitting node, and the occupied channel(s) may be used for transmission of a signal and/or channel.

In the exemplary embodiment shown in FIG. 3A, the LBT operation performed by the transmitting node may succeed in all the RB sets with the bandwidth part. In this case, the transmitting node may transmit a signal and/or channel using the entire band of the bandwidth part. In the exemplary embodiment shown in FIG. 3B, the LBT operation performed by the transmitting node may succeed in the RB sets #1, #3, and #4 belonging to the bandwidth part. In this case, the transmitting node may transmit a signal and/or channel using the RB sets #1, #3, and #4.

In the exemplary embodiment shown in FIG. 3C, the LBT operation performed by the transmitting node may succeed in the RB sets #1, #2, and #3 belonging to the bandwidth part. In this case, the transmitting node may transmit a signal and/or channel using the RB sets #1, #2, and #3. In the exemplary embodiments, the success of the LBT operation may mean that the channel is determined to be in idle state as a result of the LBT operation (e.g., CCA operation) performed by the communication node (e.g., transmitting node). On the other hand, the failure of the LBT operation may mean that the channel is determined to be in occupied state as a result of the LBT operation (e.g., CCA operation) performed by the communication node (e.g., transmitting node).

Meanwhile, a guard band may be inserted between RB sets included in a carrier and/or a bandwidth part. The transmitting node may transmit a signal in a frequency region excluding the guard band in an occupied RB set. Thus, a normal channel sensing operation in an unoccupied RB set may be guaranteed. For example, in the exemplary embodiment shown in FIG. 3B, to ensure a normal channel sensing operation in the RB set #2, guard bands may be inserted in the RB sets #1 and #3, and the transmitting node may not transmit a signal and/or channel in the corresponding guard bands in the RB sets #1 and #3. Therefore, interferences on the RB set #2 by the communication using the RB set #1 and/or the RB set #3 can be minimized. In the exemplary embodiment shown in FIG. 3C, to ensure a normal channel sensing operation in the RB set #4, a guard band may be inserted in the RB set #3, and the transmitting node may not transmit a signal and/or channel in the corresponding guard band in the RB set #3. Therefore, interferences on the RB set #4 by the communication using the RB set #3 can be minimized. The guard band described above may be referred to as 'in-carrier guard band' to distinguish it from guard bands that are typically located outside a carrier bandwidth.

Configuration information of RB sets belonging to a carrier and bandwidth part may be predefined for each 'channel' to which the carrier and bandwidth part are allocated. In addition, configuration information of guard bands belonging to a carrier and bandwidth part may be predefined for each 'channel' to which the carrier and bandwidth part are allocated. The configuration information of RB sets and the configuration information of guard bands may include information indicating the number of RB sets constituting the carrier and/or bandwidth part, information related to a set of RB(s) constituting each RB set, information indicating the number of guard bands constituting the carrier and/or bandwidth part, information related to a set of RB(s) constituting each guard band, and the like. For example, in case of the subcarrier spacing of 30 kHz, a bandwidth of one 20 MHz RB set may be defined to correspond to 51 consecutive RBs. In case of the subcarrier spacing of 15 kHz, a bandwidth of one 20 MHz RB set may be defined to correspond to 106 consecutive RBs. The configuration information of RB sets and/or the configuration information of guard bands may be shared in advance between the base station and the terminal.

Alternatively, the base station may signal to the terminal some or all of the configuration information of the RB sets for the bandwidth part. The frequency position of each RB set (e.g., the starting PRB index of the RB set) may be predefined for each channel. Alternatively, the base station may signal information indicating the frequency position of each RB set to the terminal. For another example, the number of RB sets constituting the bandwidth part, information on the RB(s) constituting each RB set, and/or information on a set of RB(s) constituting each guard band may be signaled to the terminal. In a specific case, the information on the RB(s) constituting each RB set and the information on the set of RB(s) constituting each guard band may be substitutive for each other. In this case, one of the information on the RB(s) constituting each RB set and the information on the set of RB(s) constituting each guard band may be signaled from the base station to the terminal.

In unlicensed band communication, the transmitting node may occupy a channel for a time, when the LBT operation is successful. In this case, a channel occupancy time or a channel occupancy period may be referred to as 'channel occupancy time (COT)'. The expression that the transmitting node succeeds in the LBT operation may mean that the transmitting node secures a COT. The transmitting node may transmit a signal and/or a channel using a part of the COT or the entire COT initiated by the transmitting node. In addition, the COT initiated by the transmitting node may be shared with a receiving node (e.g., a communication node performing a reception operation). Within the COT shared between the transmitting node and the receiving node, the receiving node may not only perform a reception operation but also perform a transmission operation. Accordingly, the transmitting node may not only perform a transmission operation but also perform a reception operation within the shared COT. In the exemplary embodiments, the 'transmitting node' may refer to a node that started or initiated a COT (e.g., initiating node), and the 'receiving node' may refer to a node that transmits and receives a signal within the corresponding COT without starting or initiating the corresponding COT.

The terminal may transmit a data channel in the guard band within the carrier or bandwidth part. Alternatively, the terminal may not transmit a data channel in the guard band within the carrier or bandwidth part. The terminal may determine whether to transmit a data channel in the guard band within the carrier or bandwidth part according to a time period within the COT or a transmission burst period. The guard bands (e.g., guard RB(s)) may be regarded as a reserved resource. The guard RB(s) may be configured as a reserved resource, and the terminal may transmit or receive a data channel (e.g., PUSCH, PDSCH, PSSCH) by performing a rate matching operation in the reserved resource. The terminal may map the data channel to a resource region excluding the reserved resource, and transmit the mapped data channel. The above-described operation of the terminal may be performed when a part of the reserved resource or the entire reserved resource is included in a resource region of the data channel.

Figure 4A:
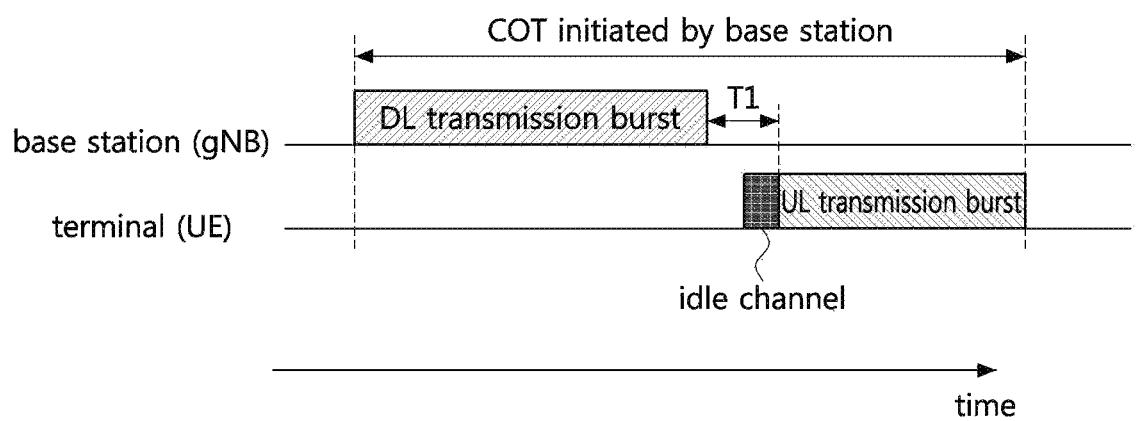
FIG. 4A is a conceptual diagram illustrating a first exemplary embodiment of a method for communications within a COT.

FIG. 4A is a conceptual diagram illustrating a first exemplary embodiment of a method for communications within a COT.

Referring to FIG. 4A, a base station (e.g., gNB) may acquire a COT by performing a CCA operation. The base station may transmit a downlink transmission burst at the beginning part of the COT. The downlink transmission burst may be a set or transmission of consecutive downlink signals and/or channels in the time domain. An uplink transmission burst may be a set or transmission of consecutive uplink signals and/or channels in the time domain. The expression that the signals and/or channels constituting the downlink transmission burst and the uplink transmission burst are consecutive in the time domain may mean that a gap between transmissions of the signals and/or channels is less than or equal to a reference value. For example, the reference value may be 0. For another example, the reference value may be a value greater than 0 (e.g., 16 μs). The COT initiated by the base station may be shared with a terminal. The terminal may transmit an uplink transmission burst within the shared COT.

In this case, the terminal may perform an LBT operation for transmission of the uplink transmission burst. For example, the terminal may perform a CCA operation after the transmission of the downlink transmission burst is completed. When it is determined that a channel state is idle as a result of the CCA operation, the terminal may transmit the uplink transmission burst. Alternatively, the terminal may transmit the uplink transmission burst without performing a CCA operation. For example, when a time interval (e.g., T1) between the downlink transmission burst and the uplink transmission burst is equal to or less than a preconfigured value (e.g., 16 μs), or when the base station instructed the terminal to perform the LBT operation according to the LBT category 1, the terminal may transmit the uplink transmission burst without performing a CCA operation. T1 may be a time interval between an ending time point of the downlink transmission burst and a starting time point of the uplink transmission burst.

Figure 4B:
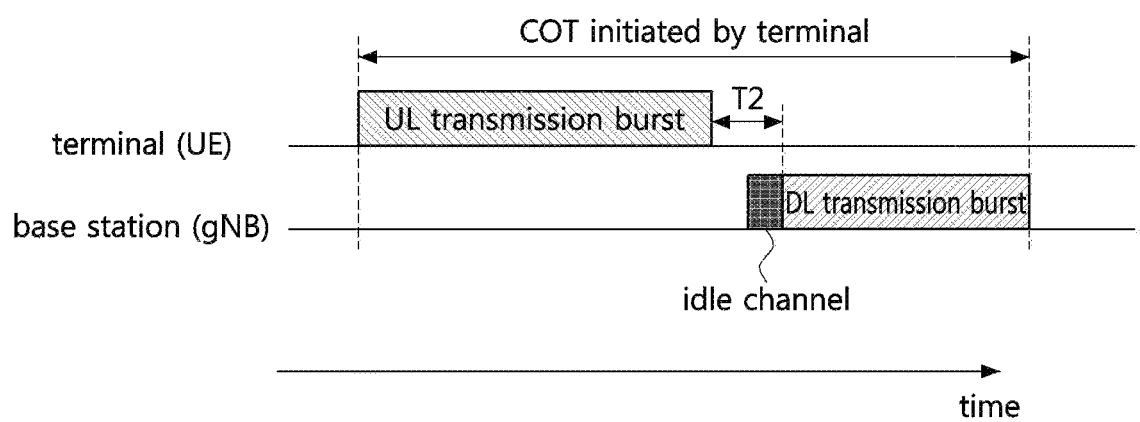
FIG. 4B is a conceptual diagram illustrating a second exemplary embodiment of a method for communications within a COT.

FIG. 4B is a conceptual diagram illustrating a second exemplary embodiment of a method for communications within a COT.

Referring to FIG. 4B, the terminal may acquire a COT by performing a CCA operation. The terminal may transmit an uplink transmission burst at the beginning part of the COT. The COT initiated by the terminal may be shared with the base station. The base station may transmit a downlink transmission burst within the shared COT. In this case, the base station may perform an LBT operation for transmission of the downlink transmission burst. For example, the base station may perform the CCA operation after the transmission of the uplink transmission burst is completed. When it is determined that a channel state is idle as a result of the CCA operation, the base station may transmit the downlink transmission burst. Alternatively, the base station may transmit the uplink transmission burst without performing a CCA operation. For example, when a time interval (e.g., T2) between the uplink transmission burst and the downlink transmission burst is equal to or less than a preconfigured value (e.g., 16 μs), the base station may transmit the downlink transmission burst without performing a CCA operation. T2 may be a time interval between an ending time point of the uplink transmission burst and a starting time point of the downlink transmission burst.

The maximum occupancy time (or maximum signal-transmittable time) of the channel according to the CCA operation may be defined as a maximum COT (MCOT). In exemplary embodiments, the MCOT of the channel according to the CCA operation performed by the base station may be referred to as 'downlink MCOT', and the MCOT of the channel according to the CCA operation performed by the terminal may be referred to as 'uplink MCOT'. Therefore, the COT initiated by the base station may not exceed the downlink MCOT, and the COT initiated by the terminal may not exceed the uplink MCOT. The downlink MCOT may be predefined in the technical specification depending on a spectrum regulation, a channel access priority class, and the like. The uplink MCOT may be predefined in the technical specification depending on a spectrum regulation, a channel access priority class, and the like. Alternatively, the base station may inform the terminal of the uplink MCOT.

Meanwhile, uplink unicast data (e.g., uplink shared channel (UL-SCH)) may be transmitted through an uplink data channel (hereinafter referred to as a 'PUSCH'). The PUSCH may be scheduled by a dynamic grant or a configured grant. The scheme in which the PUSCH is scheduled by a dynamic grant may be a scheme of dynamically indicating scheduling information of the PUSCH to the terminal through physical layer signaling (e.g., DCI). The DCI may be transmitted to the terminal through a downlink control channel (e.g., PDCCH). The scheme in which the PUSCH is scheduled by a configured grant may be a scheme of semi-statically or semi-persistently configuring scheduling information of the PUSCH to the terminal or dynamically reconfiguring the scheduling information to the terminal through higher layer signaling (e.g., RRC signaling) and/or physical layer signaling (e.g., DCI).

The scheduling information of the PUSCH may include resource allocation information. The terminal may be configured by the base station a resource region in which the PUSCH according to the configured grant (hereinafter, referred to as a 'configured grant (CG) PUSCH') can be transmitted. The resource region in which the configured grant PUSCH can be transmitted may be referred to as a 'configured grant (CG) resource'. When uplink traffic occurs, the terminal may transmit the PUSCH through the configured grant resource without transmitting a separate scheduling request (SR) and receiving a dynamic grant according to the scheduling request. In the NR communication system, methods of configuring the configured grant resource may be classified into two types. In the type 1 configuration method of the configured grant resource, both of configuration of the scheduling information of the PUSCH and activation of the resource (e.g., configured grant resource) may be performed by an RRC signaling procedure. In the type 2 configuration method of the configured grant resource, configuration of some of the scheduling information of the PUSCH may be performed by an RRC signaling procedure, and configuration of the remaining scheduling information of the PUSCH and activation of the resource (e.g., configured grant resource) may be performed by a physical layer signaling procedure (e.g., DCI).

In an unlicensed band, the terminal may start or initiate a COT by transmitting a configured grant PUSCH. In the exemplary embodiment shown in FIG. 4B, the uplink transmission burst may be initiated by a configured grant PUSCH. That is, a starting portion (e.g., symbols from the first symbol to the X-th symbol, slots from the first slot to the Y-th slot, or the like) of the uplink transmission burst may be occupied by at least one configured grant PUSCH. In this case, the terminal may perform a random backoff-based LBT operation (e.g., LBT operation according to the third category or LBT operation according to the fourth category) for channel access. The PUSCH may be transmitted in the configured grant resource.

The terminal may autonomously transmit the PUSCH using the configured grant resource without receiving a dynamic grant from the base station. Therefore, a transmission delay according to the configured grant may be reduced compared to a transmission delay according to the dynamic grant. In addition, when a configured grant is used, a probability of transmission failure of the PUSCH due to failure of the LBT operation may be reduced than a probability of transmission failure of a PUSCH due to failure of the LBT operation when a dynamic grant is used. In the following exemplary embodiments, methods for configuring configured grant resources in a communication system supporting an unlicensed band will be described.

[Frequency Domain Resource Configuration Method]

Each of one or more bandwidth parts may be composed of one or more RB sets. In an activated uplink bandwidth part or an activated downlink bandwidth part, the LBT operation may be performed for each RB set, and various combinations of RB sets may be occupied by a communication node (e.g., terminal or base station) that initiated a COT according to the result of the LBT operation. A UL transmission burst or a DL transmission burst may be transmitted through the various combinations of RB sets.

FIG. 5A is a conceptual diagram illustrating a first exemplary embodiment of a PUSCH transmission method according to a combination of RB set(s), and FIG. 5B is a conceptual diagram illustrating a second exemplary embodiment of a PUSCH transmission method according to a combination of RB set(s).

Referring to FIGS. 5A and 5B, one uplink bandwidth part may include three RB sets. The terminal may perform an LBT operation in each of the RB sets, and may occupy one combination among eight combinations of the RB sets according to results of the LBT operations.

In the exemplary embodiment shown in FIG. 5A, the terminal may transmit one PUSCH using all RB set(s) where the LBT operations are successful. For example, when the LBT operations are successful in the first RB set and the second RB set (e.g., a6), the terminal may transmit one PUSCH in a preconfigured time interval through the first RB set and the second RB set. That is, the one PUSCH may be mapped to the first RB set and the second RB set. The one PUSCH may include one transport block (TB). Alternatively, when the number of transmission layers for the PUSCH is greater than or equal to a reference value, the one PUSCH may include a plurality of TBs. In this case, a frequency domain resource region of the PUSCH may be different according to each combination of the RB set(s).

In the transmission procedure of the configured grant PUSCH, the base station may independently configure a configured grant resource for each of the combinations of the RB set(s) corresponding to a1 to a7 in FIG. 5A. The terminal may receive configuration information of seven configured grant resources from the base station. A frequency domain resource region of each of the configured grant resources may correspond to each of the seven combinations of the RB set(s). The PUSCH may be mapped to some or all of PRB(s) constituting each RB set. In addition, a guard band may be inserted between the RB sets constituting the bandwidth part.

In the exemplary embodiment illustrated in FIG. 5B, the terminal may transmit one PUSCH in each of the RB sets where the LBT operations are successful. For example, when the LBT operations are successful in the first RB set and the second RB set (e.g., b6), the terminal may transmit one PUSCH in a preconfigured time interval through each of the first RB set and the second RB set. That is, two PUSCHs may be transmitted. One PUSCH may include one TB. Alternatively, one PUSCH may include a plurality of TBs according to the number of transmission layers for the PUSCH. In this case, a frequency domain resource region of the PUSCH may be allocated for each RB set. In the transmission procedure of the configured grant PUSCH, the base station may independently configure the configured grant resource for each of the RB sets to the terminal. That is, the terminal may receive configuration information of three configured grant resources from the base station. The frequency domain resource region of each of the configured grant resources may correspond to each of the three RB sets.

According to the above-described method, due to the uncertainty of the LBT operations, the terminal may need to receive configuration information of a plurality of configured grant resources from the base station. When a plurality of configured grant resources are configured according to a plurality of combinations of the RB set(s), the remaining configuration information (e.g., time domain resource allocation information, DM-RS configuration information, antenna port information, modulation and coding scheme (MCS) information, power control information, frequency hopping information, etc.) excluding frequency domain resource allocation information may be configured identically for the plurality of configured grant resources.

Even in this case, when a plurality of configured grant resources are independently configured to the terminal, the same configuration information may be redundantly signaled and unnecessary signaling overhead may be increased. In addition, in the exemplary embodiment shown in FIG. 5A, as the number of RB sets increases, the number of configured grant resources that should be configured to the terminal may rapidly increase. In the exemplary embodiments, the 'configured grant resource configuration' may mean an 'operation for configuring the configured grant resource'. In addition, the configured grant resource configuration may mean 'configuration information of the configured grant resource' or a 'signaling unit of the configured grant resource configuration'. The base station may configure one or more configured grant resource configurations to the terminal. That is, the terminal may receive one or more configured grant resource configurations from the base station.

In order to overcome the problem of the above-described method, one configured grant resource configuration may include frequency domain resource allocation information for a plurality of combinations of RB set(s). This method may be referred to as 'Method 100'. The operation for configuring a configured grant resource may include both of the operation according to the type 1 configuration method and/or the type 2 configuration method of the configured grant resource. For example, the operation for configuring a configured grant resource may include an operation for activating the configured grant resource, a re-initialization operation of the configured grant resource, and the like.

Frequency domain resource allocation information for each of the combinations of RB set(s) may be individually configured to the terminal. For example, the frequency domain resource allocation information for each of the combinations of RB set(s) may be transmitted to the terminal through an individual RRC parameter. This method may be referred to as 'Method 110'. Alternatively, one frequency domain resource allocation information (e.g., one RRC parameter) may be configured to the terminal. Based on the one frequency domain resource allocation information (e.g., frequency domain resource allocation information included in one configured grant resource configuration), the terminal may obtain frequency domain resource allocation information for each of the combinations of the RB set(s) (e.g., one or more RB sets among all RB sets constituting the same bandwidth part). This operation may be referred to as 'Method 120'. In the exemplary embodiments to which Method 120 is applied, information (e.g., time domain resource allocation information) other than the one frequency domain resource allocation information may be configured commonly to a plurality of terminals. In this case, the terminal may obtain the common time domain resource allocation information for the combinations of the RB set(s) (e.g., one or more RB sets among all RB sets constituting the same bandwidth part). The one frequency domain resource allocation information and the common time domain resource allocation information may be included in one configured grant resource configuration.

Frequency domain resource allocation schemes of an uplink channel (e.g., PUSCH or PUCCH) in an unlicensed band will be described. In order to satisfy the occupied channel bandwidth (OCB) requirements in the unlicensed band, an interlace-based uplink channel (e.g., PUSCH or PUCCH) resource allocation scheme in the frequency domain may be used.

Figure 6:
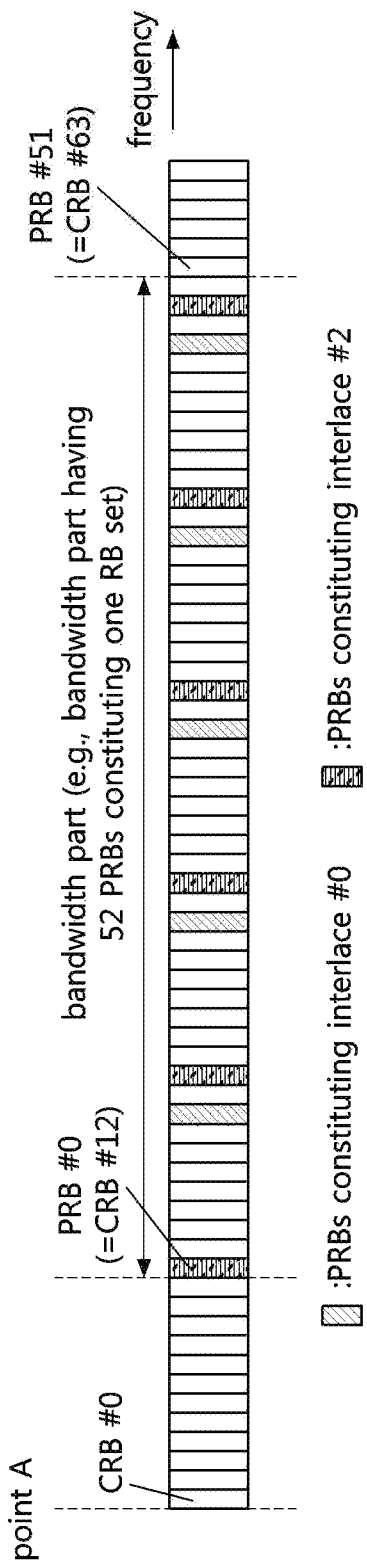
FIG. 6 is a conceptual diagram illustrating a first exemplary embodiment of an interlace-based PUSCH frequency domain resource allocation scheme.

FIG. 6 is a conceptual diagram illustrating a first exemplary embodiment of an interlace-based PUSCH frequency domain resource allocation scheme.

Referring to FIG. 6, a bandwidth part may be composed of 52 consecutive PRBs corresponding to CRBs #12 to #63. One interlace may be composed of PRBs corresponding to CRBs having the same interval. When a specific subcarrier spacing (e.g., 15 kHz) is used, one interlace may be composed of PRBs corresponding to every $10^{th}$ CRBs. In this case, an interval M between the CRBs may be 10. When M is 10, 10 different interlaces may be defined. The interlace #0 may be composed of PRBs (i.e., PRBs #8, #18, #28, #38, and #48) corresponding to the CRBs #0, #10, #20, #30, and the like. The interlace #2 may be composed of PRBs (i.e., PRBs #0, #10, #20, #30, #40, and #50) corresponding to the CRBs #2, #12, #22, #32, and the like. The position of each interlace may be determined based on the point A. Also, the number of PRBs constituting some interlaces may be one more than the number of PRBs constituting other interlaces depending on the size of the bandwidth part or the RB set. Alternatively, the number of PRBs constituting some interlaces may be one less than the number of PRBs constituting other interlaces according to the size of the bandwidth part or the RB set.

An uplink channel (e.g., PUSCH or PUCCH) may be allocated to one or more RB sets within one bandwidth part. When PUSCH is assigned to a plurality of RB sets, one interlace may be composed of PRBs of the plurality of RB sets, and PRBs corresponding to one interlace may correspond to CRBs having the same interval. The base station may configure or indicate one or more interlaces (e.g., interlace numbers, interlace indexes) to the terminal as frequency domain resource allocation information of the PUSCH. In addition, the base station may configure or indicate the RB set(s) (e.g., RB set numbers, RB set indexes) to which the interlace(s) are mapped together with the interlace(s) to the terminal. The configuration information of the configured grant resources may include the frequency domain resource allocation information, and the frequency domain resource allocation information may include information of the interlace(s). The information of the RB set(s) mapped to the interlace(s) indicated by the frequency domain resource allocation information may be included in the corresponding frequency domain resource allocation information or the configuration information of the configured grant resource.

In the exemplary embodiment shown in FIG. 6, the base station may configure or indicate the interlace #0 or the interlace #2 to the terminal. In this case, the terminal may transmit the PUSCH through the 5 PRBs corresponding to the interlace #0. Alternatively, the terminal may transmit the PUSCH through the 6 PRBs corresponding to the interlace #2. Alternatively, the base station may configure or indicate the interlaces #0 and #2 to the terminal. In this case, the terminal may transmit the PUSCH through the 11 PRBs corresponding to the interlaces #0 and #2. In the exemplary embodiment shown in FIG. 6, the bandwidth part may be composed of one RB set, and in this case, information on the RB set(s) may not be transmitted from the base station to the terminal.

Figure 7:
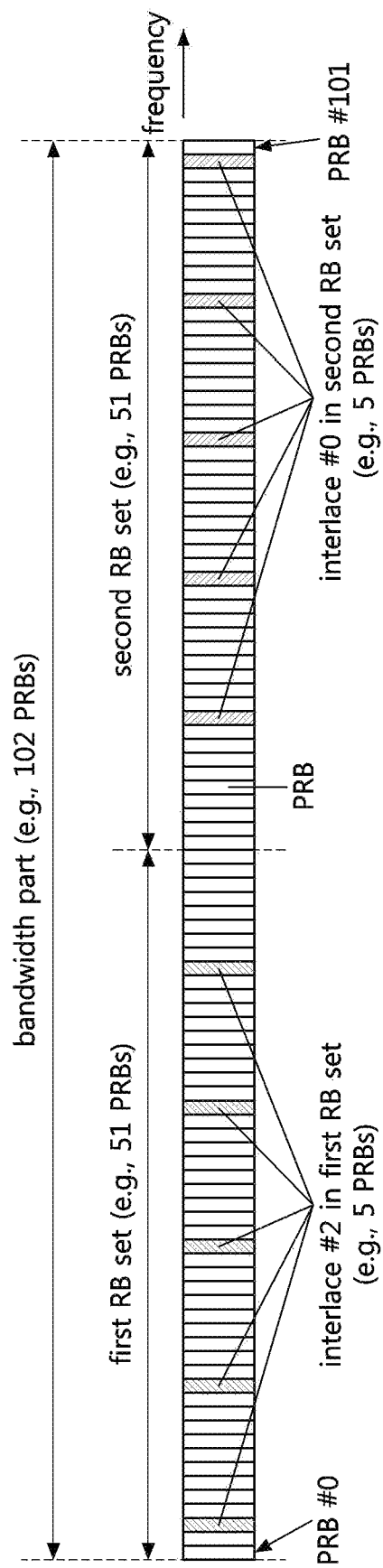
FIG. 7 is a conceptual diagram illustrating a first exemplary embodiment of a method for allocating a PUSCH resource according to Method 110.

FIG. 7 is a conceptual diagram illustrating a first exemplary embodiment of a method for allocating a PUSCH resource according to Method 110, and FIG. 8 is a conceptual diagram illustrating a first exemplary embodiment of a method for allocating a PUSCH resource according to Method 120.

Referring to FIGS. 7 and 8, a bandwidth part composed of two RB sets may be configured to the terminal. The bandwidth part may be composed of 102 consecutive PRBs, and each RB set may be composed of 51 consecutive PRBs. The bandwidth part may be an uplink bandwidth part and may be activated in the terminal in various manners. According to results of performing the LBT operations, the terminal may occupy the first RB set (hereinafter referred to as a 'first RB set combination'), the second RB set (hereinafter referred to as a 'second RB set combination'), or the first RB set and the second RB set (hereinafter referred to as a 'third RB set combination'). The first RB set combination may be an RB set combination consisting of the first RB set, the second RB set combination may be an RB set combination consisting of the second RB set, and the third RB set combination may be an RB set combination consisting of the first RB set and the second RB set. The terminal may transmit the PUSCH using the first RB set combination, the second RB set combination, or the third RB set combination. The PUSCH may be a configured grant PUSCH. In the exemplary embodiments, a combination of RB set(s) may be referred to as an 'RB set combination'.

In the exemplary embodiment shown in FIG. 7, for transmission of the PUSCH according to an RB set combination, the terminal may receive configuration information of configured grant resources from the base station by Method 110. For example, the base station may configure any one configured grant resource to the terminal. The configured grant resource configuration may include allocation information of frequency domain resources for one or more RB set combinations among the first RB set combination, the second RB set combination, and the third RB set combination.

In the exemplary embodiment shown in FIG. 7, for transmission of the configured grant PUSCH in the first RB set combination and the second RB set combination, the terminal may receive configuration information (e.g., allocation information) of each of the interlaces #2 and #0 from the base station. The configuration information of each of the interlaces #2 and #0 may be included in the configuration information of the configured grant resource (e.g., frequency domain resource allocation information). The interlace #2 may be configured for the first RB set combination, and the interlace #0 may be configured for the second RB set combination. The frequency domain resource allocation information may be used for transmission of the configured grant PUSCH in the third RB set combination.

For example, when one PUSCH is to be transmitted in the first RB set and the second RB set (e.g., when the LBT operations are successful in the first RB set and the second RB set), the terminal may map the PUSCH to the interlace #2 of the first RB set and the interlace #0 of the second RB set. That is, the PUSCH may be mapped to 10 PRBs. Alternatively, the terminal may receive configuration information (allocation information) of the interlace for transmission of the configured grant PUSCH in the third RB set combination from the base station. The interlace for the third RB set combination may be configured or indicated independently of the interlaces for other RB set combinations (e.g., the first RB set combination and the second RB set combination). Information on the RB set combination corresponding to the configuration information of each interlace may be included in the configured grant resource configuration.

In the exemplary embodiment shown in FIG. 8, the terminal may receive configuration information of the configured grant resource according to Method 120 from the base station. For example, the base station may configure any one configured grant resource to the terminal. The configured grant resource configuration may include allocation information of a single frequency domain resource (or joint allocation information of a frequency domain resource).

The terminal may obtain the allocation information of a single frequency domain resource from the base station, and may identify PRB allocation information for transmission of the configured grant PUSCH in each RB set combination (e.g., each combination of one or more RB sets among all RB sets constituting one bandwidth part) based on the configuration information of the single frequency domain resource. In addition, the configured grant resource configuration may include common time domain resource allocation information. The common time domain resource allocation information may be configured for combinations of RB sets (e.g., one or more RB sets among all RB sets constituting one bandwidth part). The terminal may obtain the common time domain resource allocation information as well as the single frequency domain resource allocation information from the configured grant resource configuration.

In the exemplary embodiment shown in FIG. 8, the terminal may receive configuration information of the interlace #0 (e.g., information indicating the interlace #0) from the base station as the allocation information of the single frequency domain resource for the PUSCH. In case that the configured grant PUSCH is to be transmitted in the first RB set (e.g., when the LBT operation is successful in the first RB set), the terminal may map the PUSCH to the interlace #0 (e.g., PRBs #0, #10, #20, #30, #40, and #50) within the first RB set. In case that the configured grant PUSCH is to be transmitted in the second RB set (e.g., when the LBT operation is successful in the second RB set), the terminal may map the PUSCH to the interlace #0 (e.g., PRBs #60, #70, #80, #90, and #100) within the second RB set.

In case that the configured grant PUSCH is to be transmitted in the third RB set combination (e.g., when the LBT operations are successful in the first RB set and the second RB set), the terminal may map the PUSCH to the interlace #0 (e.g., PRBs #0, #10, #20, #30, #40, #50, #60, #70, #80, #90, and #100) within the third RB set combination. That is, the PUSCH may be mapped to 11 PRBs. In the exemplary embodiments, the interlace #0 may be configured with referenced to the PRB #0. However, the above-described configuration method is only one exemplary embodiment. The interlace #0 may be configured with referenced to another PRB (e.g., one PRB among the PRBs #1 to #9) according to the distance between the PRB #0 and the point A.

FIG. 9 is a conceptual diagram illustrating a second exemplary embodiment of a method for allocating a PUSCH resource according to Method 120.

Referring to FIG. 9, a bandwidth part composed of two RB sets may be configured to the terminal. The bandwidth part may be composed of 102 consecutive PRBs, and each RB set may consist of 49 consecutive PRBs. In addition, a guard band may be inserted between the RB sets. The guard band may consist of four consecutive PRBs. The bandwidth part may be an uplink bandwidth part and may be activated in the terminal in various manners. In the same or similar manner to the above-described exemplary embodiments, the terminal may occupy the first RB set (hereinafter referred to as a 'first RB set combination'), the second RB set (hereinafter referred to as a 'second RB set combination'), or the first and second RB sets (hereinafter referred to as a 'third RB set combination') according to results of performing the LBT operations. The terminal may transmit the PUSCH using the first RB set combination, the second RB set combination, or the third RB set combination. The PUSCH may be a configured grant PUSCH.

In the exemplary embodiment shown in FIG. 9, according to Method 120, the terminal may receive configuration information of the interlaces #2 and #3 (e.g., information indicating the interlaces #2 and #3) from the base station as allocation information of a single frequency domain resource for the PUSCH. In case that the configured grant PUSCH is to be transmitted in the first RB set combination (e.g., when the LBT operation is successful in the first RB set combination), the terminal may map the PUSCH to the interlaces #2 and #3 (e.g., RBs #2, #3, #12, #13, #22, #23, #32, #33, #42, and #43) within the first RB set combination. In case that the configured grant PUSCH is to be transmitted in the second RB set combination (e.g., when the LBT operation is successful in the second RB set combination), the terminal may map the PUSCH to the interlaces #2 and #3 (e.g., RBs #53, #62, #63, #72, #73, #82, #83, #92, and #93) within the second RB set combination. In addition, in the case that the configured grant PUSCH is to be transmitted in the third RB set combination (e.g., when the LBT operation is successful in the third RB set combination), the terminal may map the PUSCH to the interlaces #2 and #3 (e.g., RBs #2, #3, #12, #13, #22, #23, #32, #33, #42, #43, #53, #62, #63, #72, #73, #82, #83, #92, and #93) within the first RB set and the second RB set. That is, the PUSCH may be mapped to 19 PRBs.

The exemplary embodiment shown in FIG. 9 may be an exemplary embodiment in which the PUSCH is not transmitted in the guard band. Alternatively, when the PUSCH is to be transmitted in the third RB set combination, the terminal may map the PUSCH to a frequency region including the guard band. In this case, the terminal may transmit the PUSCH by additionally using the PRB #52 belonging to both of the guard band and the interlace #2. For example, the terminal may activate the guard band from a predefined time point (or a preconfigured time point) within a COT or a transmission burst, and may use the activated guard band for transmission of an uplink signal (e.g., PUSCH).

The exemplary embodiments shown in FIGS. 7 to 9 may be cases in which the base station allocates configured grant PUSCH resources for all possible RB set combinations (e.g., first RB set combination, second RB set combination, and third RB set combination) to the terminal. However, in general, the base station may allocate configured grant resources only for some RB set combinations among all the possible RB set combinations. Method 120 may also be performed based on the constraints described above. In Method 120, when it is desired to allocate the configured grant resources for only some RB set combinations, the base station may configure or indicate information on the RB set(s) or RB set combination(s) for which the configured grant resources are configured together with the configuration information of the interlaces. The configuration information of the interlaces and the information on the RB set(s) or RB set combination(s) for which the configured grant resources are configured may be included in the configuration information of the configured grant resources. In this case, Method 120 may be applied to the RB set(s) or RB set combination(s) configured or indicated by the base station. For example, the terminal may obtain frequency domain resource allocation information of the PUSCH for each of combination(s) of RB sets consisting of the RB set(s) to which the configured grant resources are allocated, through Method 120. These operations may also be applied to the exemplary embodiments described below.

Meanwhile, a method in which some of parameters constituting a configured grant resource configuration may be configured to the terminal, and shared by a plurality of configured grant resource configurations may be used. This method may be referred to as 'Method 200'. For example, for a plurality of configured grant resource configurations, the remaining information (e.g., (common) time domain resource allocation information, etc.) excluding frequency domain resource allocation information may be configured to be the same values. Method 200 may be used to reduce the signaling overhead of the configured grant resource configuration. As an exemplary embodiment for Method 200, one or more configured grant resource configurations may be regarded as a group or a set, and the configured grant resource configuration may be performed on a group basis. In this case, the parameter(s) shared by the configured grant resource configuration(s) constituting the same group may be defined for the corresponding group, and may be transmitted only once without redundancy. The parameter(s) shared by the configured grant resource configuration(s) constituting the same group may be configured on a group basis. On the other hand, the parameter(s) (e.g., frequency domain resource allocation information) that are not shared by the configured grant resource configuration(s) constituting the group may be defined for each configured grant resource configuration, and may be transmitted independently.

In another exemplary embodiment, a first configured grant resource configuration may include information or an index for referring to a second configured grant resource configuration. For example, the second configured grant resource configuration may be configured to the terminal, and may include all configuration parameters. In this case, the first configured grant resource configuration may be configured to the terminal. The first configured grant resource configuration may include some configuration parameters (e.g., frequency domain resource allocation information). The remaining configuration parameters for the first configured grant resource configuration (e.g., remaining configuration parameters excluding the frequency domain resource allocation information) may refer to the second configured grant resource configuration.

Alternatively, the first configured grant resource configuration may include the index of the second configured grant resource configuration. In this case, the remaining configuration parameters for the first configured grant resource configuration may refer to the second configured grant resource configuration indicated by the index included in the corresponding first configured grant resource configuration. The configuration parameters not included in the first configured grant resource configuration (e.g., the remaining configuration parameters) may be considered to have the same values as the configuration parameters of the referenced second configured grant resource configuration. For example, the first configured grant resource configuration may include the frequency domain resource allocation information and the index of the second configured grant resource configuration.

The type 1 configuration method of the configured grant resource may be applied to the above-described exemplary embodiments. On the other hand, in the type 2 configuration method of the configured grant resource, the resource and scheduling information of the configured grant PUSCH may be activated or initialized by DCI. In this case, one or more configured grant resource configurations constituting the above-described group may be activated or initialized by one DCI. That is, a joint activation method or initialization method by a single DCI may be used. The single DCI may include the shared configuration parameter(s) only once, and may include unshared configuration parameter(s) for each configured grant resource configuration.

[TBS Determination Method]

The transport block size (TBS) for a data channel (e.g., PUSCH, PDSCH) may be determined using a function of the total number of REs or an approximation of the number of REs (hereinafter referred to as '$N_{RE}$') allocated to the data channel. This operation may be applied to the NR communication system. For example, the terminal may calculate $N'_{RE}$ based on Equation 1 below.

$$N'_{RE} = N_{SC}^{RB} \times N_{symb}^{sh} - N_{DMRS}^{PRB} - N_{oh}^{PRB} \quad \text{[Equation 1]}$$

$N_{SC}^{RB}$ may be the number of subcarriers per RB, $N_{symb}^{sh}$ may be the number of symbols allocated to the PUSCH within a slot, $N_{DMRS}^{PRB}$ may be the number of REs for DM-RSs per PRB including overhead of a DM-RS code division multiplexing (CDM) group without data, and $N_{oh}^{PRB}$ may be an overhead value configured from the base station. The terminal may derive $N_{RE}$ based on $N'_{RE}$ calculated by Equation 1. For example, the terminal may calculate $N_{RE}$ based on Equation 2 below.

$$N_{RE} = \min(156, N'_{RE}) \times n\text{PRB} \quad \text{[Equation 2]}$$

nPRB may be the number of PRBs allocated to the terminal for the PUSCH. As a next step, the terminal may derive $N_{info}$, an intermediate value of information bits, based on $N_{RE}$ calculated by Equation 2. For example, the terminal may calculate $N_{info}$ based on Equation 3 below.

$$N_{info} = N_{RE} \times R \times Q_m \times v \quad \text{[Equation 3]}$$

R may be a target code rate, $Q_m$ may be a modulation level, and v may be the number of transmission layers. R, $Q_m$, and v may be dynamically scheduled to the terminal through DCI. Alternatively, R, $Q_m$, and v may be semi-persistently scheduled to the terminal through RRC signaling. As a next step, when $N_{info}$ calculated by Equation 3 is less than or equal to a reference value, the terminal may convert $N_{info}$ into a quantized value according to a predefined equation, and select a TBS having a value closest to the quantized value from a predefined table.

On the other hand, when $N_{info}$ calculated by Equation 3 exceeds the reference value, the terminal may directly derive a TBS from $N_{info}$ based on a predefined equation. The above-described procedure may be applied when $I_{MCS}$ is allocated as an entry having both R and $Q_m$ (e.g., $0 \leq I_{MCS} \leq 27$ or $0 \leq I_{MCS} \leq 28$). When $I_{MCS}$ is allocated as an entry other than the above-described entry, the terminal may assume the current TBS as the size of the same TB in the previous transmission procedure. When repetitive transmission of the PUSCH is performed, $N'_{RE}$ may be the total number of REs or an approximation of the number of REs allocated to each PUSCH instance. Alternatively, when repetitive transmission of the PUSCH is performed, $N'_{RE}$ may be the total number of REs or an approximation of the number of REs allocated to certain PUSCH instance(s) (e.g., the first PUSCH instance, the earliest PUSCH instance).

In the following exemplary embodiments, a TBS determination method associated with the CG PUSCH frequency domain resource configuration method will be described. According to Method 100, one configured grant resource configuration may include frequency domain resource allocation information for RB set combinations (e.g., combinations of RB set(s)). In this case, a TBS for PUSCH transmission in each of the RB set combinations may be determined by frequency domain resource allocation for each of the RB set combinations. For example, the terminal may derive or determine the TBS for each RB set combination based on one configured grant resource configuration. Specifically, the procedure for determining the TBS for each of the RB set combinations may include a step of regarding the number of PRBs allocated for the PUSCH of the respective RB set combinations as nPRB in Method 100. Other steps for the TBS determination for each RB set combination may follow the above-described method.

Method 110 and Method 120 may be methods in which configuration and signaling of the frequency domain resource allocation information of Method 100 are specified. Therefore, the TBS determination method may be applied to Method 110 and Method 120.

Referring back to the exemplary embodiment shown in FIG. 7 (e.g., the exemplary embodiment to which Method 110 is applied), since the configured grant PUSCH is mapped to the 5 PRBs constituting the interlace #2 within the first RB set combination, the terminal and the base station may regard the number of PUSCH PRBs as 5 (i.e., nPRB=5), and may determine the TBS for the first RB set combination based on the number of PUSCH PRBs. Here, the PUSCH PRB may be a PRB through which the PUSCH is transmitted or mapped. Since the configured grant PUSCH is mapped to the 5 PRBs constituting the interlace #0 within the second RB set combination, the terminal and the base station may regard the number of PUSCH PRBs as 5 (i.e., nPRB=5), and may determine the TBS for the second RB set combination based on the number of PUSCH PRBs. Since the configured grant PUSCH is mapped to the 10 PRBs constituting the interlace #2 of the first RB set and the interlace #0 of the second RB set within the third RB set combination, the terminal and the base station may regard the number of PUSCH PRBs to 10 (i.e., nPRB=10), and determine the TBS for the third RB set combination based on the number of PUSCH PRBs.

Referring back to the exemplary embodiment shown in FIG. 8 (e.g., the exemplary embodiment to which Method 120 is applied), since the configured grant PUSCH is mapped to the 6 PRBs constituting the interlace #0 within the first RB set combination, the terminal and the base station may regard the number of PUSCH PRBs as 6 (i.e., nPRB=6), and may determine the TBS for the first RB set combination based on the number of PUSCH PRBs. Since the configured grant PUSCH is mapped to the 5 PRBs constituting interlace #0 within the second RB set combination, the terminal and the base station may regard the number of PUSCH PRBs as 5 (i.e., nPRB=5), and may determine the TBS for the second RB set combination based on the number of PUSCH PRBs. Since the configured grant PUSCH is mapped to the 11 PRBs constituting the interlaces #0 of the first RB set and the second RB set within the third RB set combination, the terminal and the base station may regard the number of PUSCH PRBs to 11 (i.e., nPRB=11), and may determine the TBS for the third RB set combination based on the number of PUSCH PRBs.

Referring back to the exemplary embodiment shown in FIG. 9 (e.g., the exemplary embodiment to which Method 120 is applied), since the configured grant PUSCH is mapped to the 10 PRBs constituting the interlaces #2 and #3 within the first RB set combination, the terminal and the base station may regard the number of PUSCH PRBs as 10 (i.e., nPRB=10), and may determine the TBS for the first RB set combination based on the number of PUSCH PRBs. Since the configured grant PUSCH is mapped to the 9 PRBs constituting the interlaces #2 and #3 within the second RB set combination, the terminal and the base station may regard the number of PUSCH PRBs as 9 (i.e., nPRB=9), and may determine the TBS for the second RB set combination based on the number of PUSCH PRBs. Since the configured grant PUSCH is mapped to the 19 PRBs constituting the interlaces #2 and #3 of the first RB set and the second RB set within the third RB set combination, the terminal and the base station may regard the number of PUSCH PRBs to 19 (i.e., nPRB=19), and may determine the TBS for the third RB set combination based on the number of PUSCH PRBs.

According to the above-described methods, the number of different TBS(s) may occur as many as the number of RB set combinations in maximum. For example, when the bandwidth part is composed of 4 RB sets, according to the above-described methods, up to 15 different TBSs may be derived for each RB set combination. Meanwhile, the higher layer (e.g., entity performing the higher layer function) of the terminal may generate a plurality of TBs having different sizes for the same HARQ process in consideration of a plurality of TBSs, and the plurality of TBs having different sizes may be delivered to the physical layer (e.g., entity performing the physical layer function) of the terminal. The physical layer of the terminal may select one TB among the plurality of TBs having different sizes for the same HARQ process, and transmit the selected TB through the PUSCH.

A selection criterion of the TB may be a combination of RB sets where the LBT operations are successful. The physical layer of the terminal may inform the higher layer of the terminal of the result of the TB selection. Alternatively, the higher layer of the terminal may generate only one TB for one HARQ process, and may deliver the one TB to the physical layer of the terminal. When a plurality of TBSs are derived for PUSCH transmission as in the above-described exemplary embodiment, one TB may have one size among the plurality of TBSs. When considering such the operation of the terminal, as the number of TBSs configured for the configured grant PUSCH transmission increases, the complexity of the MAC layer protocol of the terminal may increase.

As a method for limiting the number of TBSs, a plurality of RB set combinations may be grouped, and a common TBS may be applied to RB set combinations belonging to the same group. In an exemplary embodiment of the grouping method, RB set combination(s) including the same number of RB sets may belong to the same group. In addition, a common TBS may be determined based on PUSCH resource allocation of one RB set combination (hereinafter referred to as a 'representative RB set combination') among the RB set combination(s) belonging to the group. Alternatively, the common TBS may be determined based on PUSCH resource allocation of at least one RB set combination(s) (e.g., all RB set combination(s)) among the RB set combination(s) belonging to the group.

Referring back to the exemplary embodiment shown in FIG. 8 (e.g., the exemplary embodiment to which Method 120 is applied), the first RB set combination and the second RB set combination may belong to one group. In this case, a common TBS may be applied to the first RB set combination and the second RB set combination, and the common TBS may be determined based on PUSCH resource allocation one of the first RB set combination and the second RB set combination. For example, the first RB set combination may be a representative RB set combination for the group, and the common TBS for the first RB set combination and the second RB set combination may be determined by considering nPRB=6. According to this method, the number of TBSs that the terminal can assume for the corresponding configured grant resource configuration may be reduced by one. Although the above-described operations have been described as being applied when the bandwidth part is composed of two RB sets, the number of bandwidth parts and the number of RB sets to which the above-described operations are applied may not be limited. As the number of RB sets used for the configured grant PUSCH transmission increases, the effect of reducing the number of TBSs by the above-described method may be greater.

The representative RB set combination for the group of the RB set combination(s) may be signaled from the base station to the terminal. Alternatively, the representative RB set combination for the group of the RB set combination(s) may be determined by a predefined rule. For example, the representative RB set combination may be determined by considering the indexes or numbers of RB(s) constituting the RB set combination(s). For another example, the representative RB set combination may be determined by considering the TBSs for the RB set combination(s). For example, an RB set combination corresponding to the smallest TBS or the largest TBS in the group may be considered as the representative RB set combination, and the smallest TBS or the largest TBS may be considered as the common TBS.

As another method of configuring the TBS, the base station may explicitly signal the TBS to the terminal. For example, TBS may be included in modulation and coding scheme (MCS) information, and the MCS information including the TBS may be signaled. Alternatively, the TBS may be defined as a separate parameter, and the separate parameter may be signaled. When Methods 100 to 120 are used, the TBS may be configured for each RB set combination within one configured grant resource configuration. Alternatively, as a method for solving the above-described problem, a common TBS for a plurality of RB set combinations included in one configured grant resource configuration may be explicitly signaled. For example, the TBS may be configured on an RB set combination group basis. Alternatively, the TBS may be configured on a configured grant resource configuration basis.

Meanwhile, when a plurality of configured grant resource configurations are configured to the terminal, basically, a TBS for each configured grant resource configuration may be independently defined. Even in this case, when a plurality of configured grant resource configurations are configured, there is a problem in that the terminal needs to consider multiple TBSs for uplink transmission. As a method for solving this, a method in which the plurality of configured grant resource configurations share the same TBS may be used. For example, the base station may configure the same TBS to the terminal for a first configured grant resource configuration and a second configured grant resource configuration. That is, the terminal may receive information indicating the same TBS for the first configured grant resource configuration and the second configured grant resource configuration from the base station.

According to the above-described exemplary embodiment, one or more configured grant resource configurations may be regarded as one group or one set, and the configured grant resource configuration may be performed on a group basis. In this case, the configured grant resource configuration(s) constituting the same group may have the same TBS. As a method of realizing this, similarly to the above-described method, a common TBS may be determined based on PUSCH resource allocation of one configured grant resource configuration (hereinafter referred to as a 'representative configured grant resource configuration') in the group. The representative configured grant resource configuration may be determined by the terminal in a manner similar to the representative RB set combination determination method. Alternatively, a method of explicitly configuring a TBS to the terminal may be used. In this case, the TBS may be defined for the configured grant resource configuration group, and may be transmitted only once without redundancy. For example, the TBS may be defined on a configured grant resource configuration group basis. That is, Method 200 may be used. When MCS information including the TBS is transmitted, the MCS may be set to the same value within the configured grant resource configuration group.

According to another exemplary embodiment described above, the first configured grant resource configuration may include information or an index for referring to the second configured grant resource configuration. In this case, the TBS of the first configured grant resource configuration may be regarded as the same as the TBS of the second configured grant resource configuration. In this case, the second configured grant resource configuration may be regarded as the representative configured grant resource configuration.

[Selection Method of RB Set Combination]

The terminal may transmit a PUSCH through an RB set combination having the widest frequency range (e.g., RB set combination composed of the largest number of RB set(s)) among RB set combination(s) composed of RB set(s) in which the LBT operations are successful. In this case, the terminal may transmit one PUSCH in the RB set combination as shown in the exemplary embodiment shown in FIG. 5A. Alternatively, the terminal may transmit one PUSCH in each RB set constituting the RB set combination as shown in the exemplary embodiment shown in FIG. 5B. That is, when the RB set combination is composed of a plurality of RB sets, the terminal may transmit a plurality of PUSCHs through different RB sets at the same time.

The terminal may arbitrarily select one of the two methods described above, and transmit the PUSCH based on the selected method. According to this method, the base station may not know how many PUSCHs the terminal transmits. Therefore, the base station may need to perform a blind detection operation for the PUSCH. In order to prevent the blind detection operation for the PUSCH from being performed at the base station, a COT (e.g., COT initiated by the terminal) or a transmission burst (e.g., uplink transmission burst) may be divided into one or more time periods. One of the two methods described above may be applied to each of the time periods. For example, a starting region of the COT or transmission burst may be defined as a first period, and the remaining region (e.g., a region other than the first period) of the COT or transmission burst may be defined as a second period. For example, the first period may include symbols (i.e., X symbols) from the first symbol to the X-th symbol of the COT or transmission burst. Alternatively, the first period may include slots (e.g., Y slots) from the first slot to the Y-th slot of the COT or transmission burst. Depending on a success time point of the LBT operation, the Y slots may include a partial slot. The base station may inform the terminal of information indicating a boundary between the first period and the second period through a signaling procedure.

A transmission method applied in each time period may be predefined in the technical specification. For example, in the first period, the transmission method according to the exemplary embodiment shown in FIG. 5B (e.g., the method in which one PUSCH is transmitted in each RB set) may be applied, and in the second period, the transmission method according to the exemplary embodiment shown in FIG. 5A (e.g., the method in which one PUSCH is transmitted in all RB sets where the LBT operations are successful) may be applied. In this case, the base station may start a PUSCH detection operation in each RB set in the first period, and may identify the RB set combination in which the PUSCH is transmitted (e.g., RB set combination where the LBT operations performed by the terminal succeed) based on detected PUSCH(s) and/or other signals. Through this, the base station may perform a detection operation for one PUSCH in the RB set combination within the second period. That is, the base station may receive the configured grant PUSCH without the blind detection operation for a plurality of RB set combinations in each period. Alternatively, the transmission method applied in each time period may be signaled from the base station to the terminal.

The above-described methods may be applied to both the type 1 configuration method and the type 2 configuration method of the configured grant resource. In the case of the type 2 configuration method of the configured grant resource, the above-described methods may be applied for transmission of PUSCHs other than a PUSCH scheduled by a dynamic grant.

Meanwhile, in the type 2 configuration method of the configured grant resource, the base station may schedule a PUSCH to the terminal through a dynamic grant (e.g., DCI including uplink scheduling information), thereby performing an activation procedure, a configuration change operation, or an initialization procedure of the configured grant resource. The PUSCH may be scheduled through DCI having a CRC scrambled by a configured scheduling (CS)-RNTI. In this case, when frequency domain resources and TBSs for a plurality of RB set combinations are determined by the dynamic grant, the RB set combination in which the PUSCH is to be transmitted may need to be determined. Even in this case, the terminal may transmit the PUSCH through an RB set combination having the widest frequency range (e.g., RB set combination composed of the largest number of RB set(s)) among RB set combination(s) composed of RB set(s) where the LBT operations are successful.

In this case, the base station may inform the terminal of a method used for transmission of the PUSCH among the method according to the exemplary embodiment shown in FIG. 5A and the method according to the exemplary embodiment shown in FIG. 5B through a signaling procedure. For example, the information indicating the method used for transmission of the PUSCH may be included in the dynamic grant (e.g., DCI). That is, the DCI including the information indicating the method used for the transmission of the PUSCH may be transmitted to the terminal. As a generalized method for this operation, the base station may inform the terminal of the maximum number of PUSCHs that can be transmitted and information on RB set(s) to which each PUSCH is mapped. The terminal may transmit one or more PUSCHs in the RB set(s) where the LBT operations are successful based on the information received from the base station.

On the other hand, considering an HARQ retransmission procedure of the PUSCH, a method, in which information on the number of PUSCHs transmitted in the frequency domain and RB set combination(s) through which each PUSCH is transmitted is dynamically determined by the terminal at each specific time point, may be helpful. In this case, the terminal may actively participate in the scheduling of the PUSCH. Accordingly, the terminal may arbitrarily select one RB set combination among RB set combination(s) composed of RB set(s) where the LBT operations are successful, and may transmit the PUSCH in the selected RB set combination. This operation may be performed based on the type 1 configuration method or the type 2 configuration method of the configured grant resource. The selection operation of the RB set combination may be performed at the physical layer of the terminal. In this case, the higher layer of the terminal may generate a plurality of TBs for the same HARQ process, and may deliver the plurality of TBs to the physical layer of the terminal. Here, the sizes of the plurality of TBs may be the same or different.

Alternatively, the selection operation of the RB set combination may be performed at the higher layer (e.g., MAC layer) of the terminal. In this case, the physical layer of the terminal may transmit information on the RB set(s) where the LBT operations are successful (e.g., RB set(s) occupied by the terminal) to the higher layer of the terminal. The higher layer of the terminal may select an RB set combination in which the PUSCH is to be transmitted based on the results of the LBT operations, and transmit information on the selected RB set combination to the physical layer of the terminal. The physical layer of the terminal may transmit the PUSCH in the selected RB set combination according to the indication of the higher layer of the terminal.

Meanwhile, in order to effectively perform continuous uplink transmission in unlicensed band communication, it may be allowed for the terminal to retransmit the PUSCH in the configured grant resource. In this case, an initial configured grant PUSCH transmission and a configured grant PUSCH retransmission corresponding to the same HARQ process (or, the same set of TB(s)) may be performed according to the same configured grant resource configuration (e.g., on configured grant resources configured by the same configured grant resource configuration, following scheduling information configured by the same configured grant resource configuration, etc.). The terminal may perform the initial configured grant PUSCH transmission and the configured grant PUSCH retransmission for the same HARQ process in different periods according to the same configured grant resource configuration.

When the configured grant PUSCH retransmission is allowed to be performed in the configured grant resource, the above-described methods may be applied for PUSCH retransmission as well as initial PUSCH transmission. In addition, when the above-described methods are applied, the terminal may perform the initial configured grant PUSCH transmission and the configured grant PUSCH retransmission for the same HARQ process on the same RB set combination among RB set combination(s) configured or derived by the same configured grant resource configuration until the frequency domain resource allocation of the configured grant resource configuration is reconfigured (e.g., by a RRC signaling) or re-initialized (e.g., by a DCI), in which case the initial configured grant PUSCH transmission and the configured grant PUSCH retransmission for the same HARQ process may be performed on the same or different RB set combination(s) depending on the reconfiguration or the re-initialization. Alternatively, the terminal may autonomously determine whether to perform the initial configured grant PUSCH transmission and the configured grant PUSCH retransmission for the same HARQ process on the same RB set combination or different RB set combinations among RB set combination(s) configured or derived by the same configured grant resource configuration.

[Time Domain Resource Configuration Method]

In unlicensed band communication, the terminal may need to continuously transmit a plurality of TBs (e.g., a plurality of uplink TBs). The plurality of TBs may be transmitted through a plurality of PUSCHs. In a COT occupied by the terminal, the plurality of TBs may be transmitted through a plurality of configured grant PUSCHs. In order to support this operation, the terminal should be able to transmit a plurality of PUSCHs (e.g., a plurality of configured grant PUSCHs) corresponding to the plurality of TBs within one period of the configured grant resource. The plurality of TBs may be transmitted through different PUSCHs, and may correspond to different HARQ processes. In the following exemplary embodiments, a method for configuring time domain resources for the configured grant PUSCHs for supporting continuous transmission of uplink TBs will be described. Time domain resource allocation information may be included in configuration information of the configured grant resource.

The configured grant resource may appear periodically and repeatedly. The periodicity of the configured grant resource may be configured to the terminal, and one or more configured grant resources may be allocated within one period of the configured grant resource. Information indicating the periodicity of the configured grant resource may be included in the configuration information of the configured grant resource. The configured grant resource may refer to a candidate resource through which the PUSCH can be transmitted, and one PUSCH may be transmitted through each configured grant resource. Each configured grant resource may be allocated within one slot and may be composed of consecutive symbol(s). In the following exemplary embodiments, the number of configured grant resources allocated within one period may be expressed as 'N'. That is, N may mean the maximum number of PUSCHs that can be transmitted within one period. N may be a natural number.

In addition, M configured grant resource(s) may be allocated within one period of the configured grant resource. The M configured grant resource(s) may be continuously configured in the time domain. M may be a natural number. The M continuous configured grant resource(s) may be referred to as a 'configured grant resource group'. K configured grant resource groups may be allocated within one period. K may be a natural number. In this case, the number of continuous configured grant resource(s) constituting the k-th configured grant resource group (k=1, 2, . . . , K) may be expressed as $M_k$. The plurality of configured grant resource groups may not overlap with each other. In this case, a sum of $M_1$ to $M_K$ may be equal to N.

When K is 1 (e.g., when the number of configured grant resource groups is 1), '$M_1$=M=N' may be defined. The above-described parameters (e.g., N, M, $M_k$) may be configured to the terminal. The above-described parameters may be included in the configuration information of the configured grant resource (e.g., time domain resource allocation information). In addition, a time offset indicating the position of the configured grant resource(s) or the configured grant resource group(s) within one period may be configured to the terminal. The time offset may be a slot unit offset or a symbol unit offset. A reference time point of the time offset may be a starting time point of the period of the configured grant resource or an absolute specific time point (e.g., a starting time point of a specific radio frame). Also, one or more time offsets may be configured. For example, the time offset may be configured for each configured grant resource group.

Figure 10A:
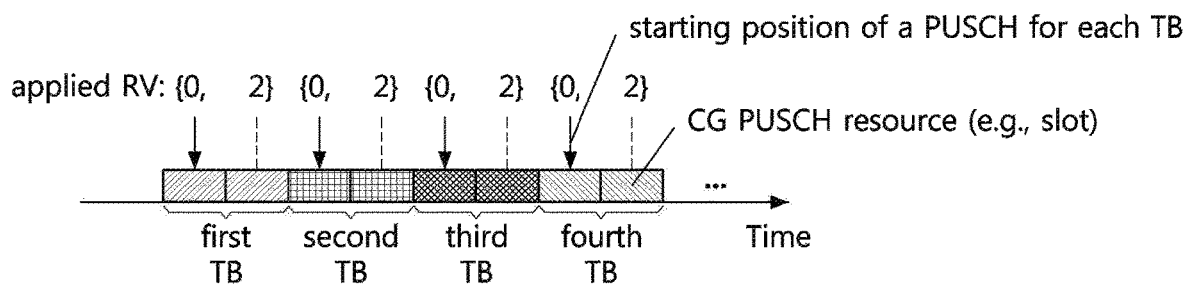
FIG. 10A is a conceptual diagram illustrating a first exemplary embodiment of a method of configuring time domain resources of configured grant PUSCHs.
Figure 10B:
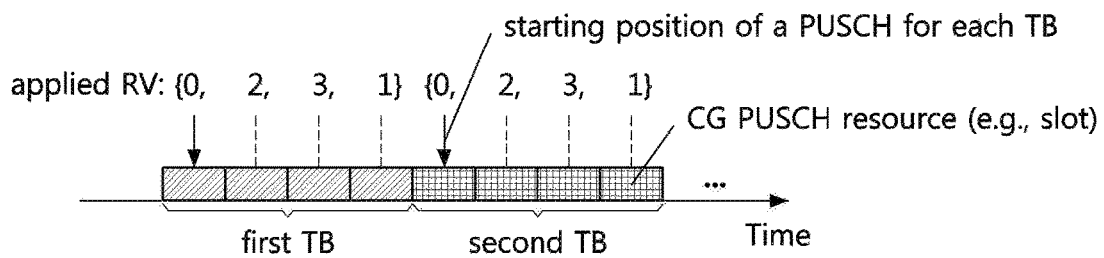
FIG. 10B is a conceptual diagram illustrating a second exemplary embodiment of a method of configuring time domain resources of configured grant PUSCHs.

FIG. 10A is a conceptual diagram illustrating a first exemplary embodiment of a method of configuring time domain resources of configured grant PUSCHs, and FIG. 10B is a conceptual diagram illustrating a second exemplary embodiment of a method of configuring time domain resources of configured grant PUSCHs.

Referring to FIGS. 10A and 10B, eight consecutive configured grant PUSCH resources may be allocated to the terminal. Here, M or $M_k$ may be 8. The configured grant PUSCH resources may be configured to the terminal in form of a configured grant resource group. The configured grant PUSCH may be arranged within one period of the configured grant resource. The position of the configured grant PUSCH within one period of the configured grant resource may be indicated by a time offset configured to the terminal.

In this case, an RV of each configured grant resource may be predefined. Alternatively, the RV of each configured grant resource may be configured to the terminal in advance. The terminal may transmit the PUSCH using the RV corresponding to each configured grant resource. A set of RV(s) (e.g., RV pattern) may be configured to the terminal. The RV pattern may be included in configuration information of the configured grant resource (e.g., time domain resource allocation information). The first RV constituting the RV pattern may be 0. In the exemplary embodiment shown in FIG. 10A, the RV pattern may be configured with (0, 2). The RV pattern may be circular-repeatedly applied to the configured grant resource(s). For example, RVs for the 8 configured grant resources may be (0, 2, 0, 2, 0, 2, 0, 2). The terminal may start transmission of the PUSCH in the configured grant resource having an RV set to 0 (i.e., RV=0).

In addition, the terminal may (repeatedly) transmit PUSCHs for the same TB in the configured grant resource(s) corresponding to the length of the RV pattern. In the exemplary embodiment shown in FIG. 10A, the first TB may be transmitted in the first and second configured grant resources, the second TB may be transmitted in the third and fourth configured grant resources, the third TB may be transmitted in the fifth and sixth configured grant resources, and the fourth TB may be transmitted in the seventh and eighth configured grant resources. The terminal may start transmission of a PUSCH for a certain TB in the configured grant resource (e.g., third configured grant resource) having an RV set to 0 (i.e., RV=0), and may repeatedly transmit PUSCH(s) for the same TB in the configured grant resources (e.g., fourth configured grant resource) corresponding to the remaining RV(s) of the RV pattern. The above-described exemplary embodiment may be valid when the LBT operation performed by the terminal succeeds within the third configured grant resource or when the LBT operation performed by the terminal succeeds before the third configured grant resource. Thereafter, for example, when the LBT operation is successful in the fifth configured grant resource or the sixth configured grant resource, the terminal may start transmission of a PUSCH for a TB in the fifth configured grant resource having an RV set to 0 (i.e., RV=0), and may repeatedly transmit PUSCH(s) for the same TB in the sixth configured grant resource after the fifth configured grant resource.

In the exemplary embodiment shown in FIG. 10B, the RV pattern may be set to (0, 2, 3, 1). The RV pattern may be circular-repeatedly applied to the configured grant resource(s). For example, RVs for the 8 configured grant resources may be set to (0, 2, 3, 1, 0, 2, 3, 1). According to the above-described methods, the terminal may transmit the first TB from the first to fourth configured grant resources, and may transmit the second TB from the fifth to eighth configured grant resources. The terminal may start transmission of a certain TB in the configured grant resource (e.g., first configured grant resource) having an RV set to 0 (i.e., RV=0), and may repeatedly transmit PUSCH(s) for the same TB in the configured grant resource(s) (e.g., second to fourth configured grant resources) corresponding to the remaining RV(s) of the RV pattern. The above-described exemplary embodiment may be valid when the LBT operation performed by the terminal succeeds within the first configured grant resource or when the LBT operation performed by the terminal succeeds before the first configured grant resource. According to the above-described method, the terminal may start uplink burst transmission only in the first and fifth configured grant resources among the 8 configured grant resources.

According to the above-described exemplary embodiments, the terminal may regard the length of the RV pattern as the maximum number (or repetition factor, slot aggregation factor) of PUSCH repetitive transmissions for the same TB. In this case, the repetition factor for the corresponding configured grant resource configuration may not be separately configured to the terminal. Even if the number of configured grant resource(s) (e.g., $M_k$, M, or N) is not divided by the length of the RV pattern, the RV pattern may be circular-repeatedly applied up to the last configured grant resource. In addition, the number of TBs that can be transmitted within one period of the configured grant resource or within one configured grant resource group may be determined by the length of the RV pattern.

Figure 11:
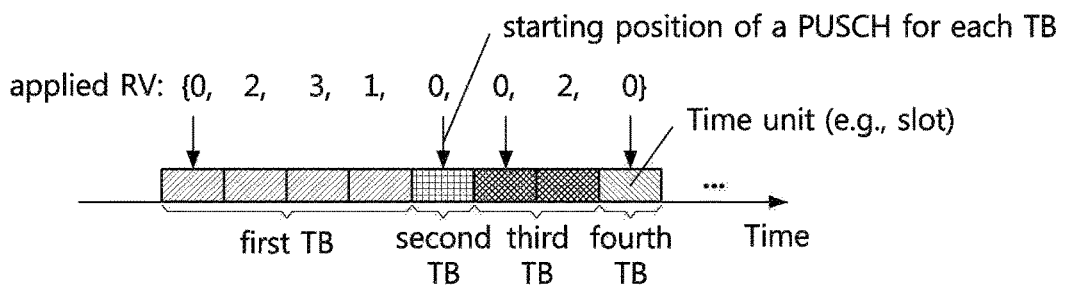
FIG. 11 is a conceptual diagram illustrating a third exemplary embodiment of a method of configuring time domain resources of configured grant PUSCHs.

FIG. 11 is a conceptual diagram illustrating a third exemplary embodiment of a method of configuring time domain resources of configured grant PUSCHs.

Referring to FIG. 11, 8 consecutive configured grant PUSCH resources may be allocated to the terminal. Here, M or $M_k$ may be 8. In this case, the base station may set the RV for each configured grant resource to the terminal. That is, the terminal may receive information indicating 8 RVs for the first to eighth configured grant resources from the base station. Here, 8 RVs may be (0, 2, 3, 1, 0, 0, 2, 0). The terminal may start transmission of a PUSCH for a certain TB in the configured grant resource (e.g., sixth configured grant resource) having an RV set to 0 (i.e., RV=0). In this case, the terminal may repeatedly transmit PUSCHs for the same TB in the configured grant resource(s) (e.g., seventh configured grant resource) before the next configured grant resource (e.g., eighth configured grant resource) having an RV set to 0 (i.e., RV=0). The above-described exemplary embodiment may be valid when the LBT operation performed by the terminal succeeds within the sixth configured grant resource or when the LBT operation performed by the terminal succeeds before the sixth configured grant resource. The terminal may transmit the first TB from the first to fourth configured grant resources, the second TB in the fifth configured grant resource, the third TB from the sixth and seventh configured grant resources, and the fourth TB in the eighth configured grant resource.

In the above-described exemplary embodiments, the RV(s) may be configured for each configured grant resource configuration. For example, when one configured grant resource configuration includes a plurality of configured grant resource groups, common RV information (e.g., RV pattern or RV(s)) may be applied to the plurality of configured grant resource groups. Alternatively, the RV(s) may be configured for each configured grant resource group. When multi-layer transmission is used, each of the first TB to the fourth TB may include a plurality of TBs. In addition, other configured grant resource(s) (e.g., other configured gran resource group(s)) may be configured together in addition to the above-described configured grant resources, and the configured grant resources configured together may follow the same period and the same configured grant resource configuration.

Meanwhile, as described above, in order to effectively perform continuous uplink transmission in unlicensed band communication, it may be allowed for the terminal to retransmit the PUSCH in the configured grant resource. In this case, within one period of the configured grant resource, only one continuous PUSCH transmission(s) for the same TB may be allowed. That is, the terminal may transmit configured grant PUSCH(s) for a certain TB in one or more continuous configured grant resource(s) within a period, and the terminal may not retransmit the PUSCH for the same TB within the same period. For example, the retransmitted PUSCH for the same TB may be transmitted in the next period within the same uplink COT or a different uplink COT. Alternatively, within one period of the configured grant resource, the terminal may transmit continuous PUSCH(s) multiple times for the same TB. Alternatively or additionally, the terminal may transmit different TBs having the same HARQ process within one period of the configured grant resource.

In the above-described exemplary embodiments, each configured grant resource may be arranged within one slot. In this case, the duration of each configured grant resource may occupy a one entire slot. That is, the duration of each configured grant resource may include all symbols (e.g., 14 symbols) within one slot. Alternatively, the duration of each configured grant resource may include some symbol(s) (e.g., one or more symbols) within one slot. In this case, the number of symbols included in the configured grant resource may be limited to a divisor(s) of the number of symbols per slot. According to the above-described limitation, the configured grant resources may be aligned at a slot boundary, and may be continuously arranged in the time domain. This feature may be important in unlicensed band communication. Alternatively, the duration of each configured grant resource may include a plurality of slots. The base station may configure the duration of the configured grant resource to the terminal. Information indicating the duration of the configured grant resource may be included in the configuration information of the configured grant resource. The duration of the configured grant resource may be configured in units of a configured grant resource configuration or a configured grant resource group. When the duration of the configured grant resource is configured in units of a configured grant resource group, different durations may be applied to a plurality of configured grant resource groups.

Meanwhile, in unlicensed band communication, uplink control information (UCI) may be piggybacked in a configured grant PUSCH. That is, the terminal may map the UCI to some region of the configured grant resource, and may transmit the PUSCH and the UCI together. Alternatively, the terminal may map the UCI to the entire configured grant resource and transmit the UCI. The UCI may be information necessary for transmission of the configured grant PUSCH. For example, the UCI may include one or more of an HARQ process identifier (ID), an MCS, an RV, a new data indicator (NDI), a UE-ID (e.g., CS-RNTI, cell (C)-RNTI, a modulation coding scheme (MCS)-C-RNTI, etc.), a UL-SCH channel access priority class (CAPC), and the like. The UCI piggybacked in the configured grant PUSCH may be referred to as 'configured grant UCI' or 'CG-UCI'. The CG-UCI may be distinguished from conventional UCI including an HARQ-acknowledgement (HARQ-ACK), an SR, and/or CSI. The transmission and reception operation of the CG-UCI may include an encoding operation and a decoding operation. For the CG-UCI transmission and reception operation, a Polar code, a Reed-Muller code, a low density parity check (LDPC) code, a turbo code, or the like may be applied. CRC may be applied to improve decoding performance of the CG-UCI. The CG-UCI may be included in all configured grant PUSCHs, and the configured grant PUSCH including the CG-UCI may be transmitted.

Each configured grant PUSCH may be transmitted together with the HARQ process ID, RV, and NDI corresponding to the configured grant PUSCH. Therefore, the terminal may autonomously determine the transmission position and the number of repetitions of the TB without relying on the above-described RV pattern or the configured grant resource group for repetitive transmission, and may transmit the TB based on the determined result. This operation may provide flexibility in terms of transmission of the terminal, but decoding performance of the PUSCH may be deteriorated in terms of reception of the base station. For example, when the base station does not receive some CG-UCI, the decoding performance of the PUSCH may be deteriorated. As a compromise of the above-described trade-off, when the terminal autonomously determines the transmission position and/or the number of repetitions of the TB, a plurality of configured grant PUSCHs for the same TB within one period of the configured grant resource may be limited to being mapped to physically contiguous slots.

The base station may feedback HARQ-ACK information (e.g., ACK or negative ACK (NACK)) for the PUSCH to the terminal. The NACK may be delivered by the base station in an implicit manner of transmitting an uplink grant for scheduling retransmission of the PUSCH to the terminal. Alternatively, the HARQ-ACK information may be explicitly transmitted to the terminal. The explicit HARQ-ACK information corresponding to the PUSCH may be referred to as 'downlink feedback information (DFI)'. Here, the PUSCH may include a configured grant PUSCH and a dynamic grant PUSCH.

The DFI may include HARQ-ACK information corresponding to all HARQ processes defined or configured in the terminal. The DFI may be expressed as a bitmap. When the number of the HARQ processes is N, the length of the bitmap representing the DFI may be N or a multiple of N. Here, N may be a natural number. For example, when the maximum number of TBs that can be included in the PUSCH is M, the length of the bitmap may be M×N. Here, M may be a natural number. For another example, when the maximum number of code block groups (CBGs) that can be included in the PUSCH is L, the length of the bitmap may be equal to or less than N×M×L. Here, L may be a natural number. That is, the terminal may obtain HARQ-ACK information corresponding to TBs and/or CBGs of all HARQ processes by receiving one DFI regardless of whether or not PUSCH transmission is performed for each HARQ process. The DFI may be transmitted on a PDCCH. The PDCCH including the DFI may be transmitted through a USS set or a CSS set. When the PDCCH including the DFI is transmitted through a CSS set, the corresponding PDCCH may be a group common PDCCH. That is, a CRC of the PDCCH may be scrambled by a group common RNTI, and the PDCCH may be received by a terminal group. The transmission timing of the DFI may be defined as follows.

Figure 12:
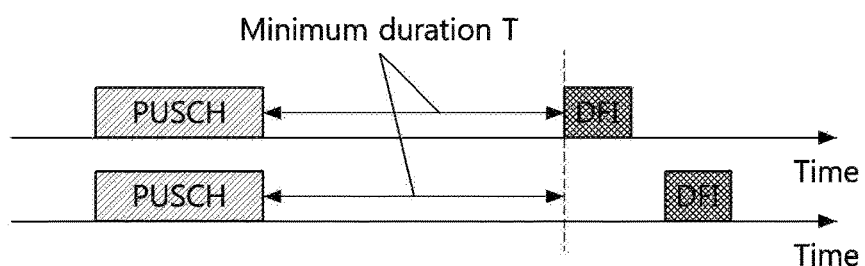
FIG. 12 is a conceptual diagram illustrating a first exemplary embodiment of DFI transmission timing.

FIG. 12 is a conceptual diagram illustrating a first exemplary embodiment of DFI transmission timing.

Referring to FIG. 12, DFI may be transmitted from a time point after a minimum duration T from an ending time point of a PUSCH (e.g., the last symbol or a time point at which the last symbol ends). The minimum duration T may mean a minimum distance between a PUSCH resource and a DFI resource. The minimum duration T may be defined in units of slots (e.g., one or more slots) or in units of symbols (e.g., one or more symbols). The base station may inform the terminal of the minimum duration T through a signaling procedure. For example, in the type 1 configuration method of the configured grant resource, information indicating the minimum duration T may be signaled through an RRC message. In the type 2 configuration method of the configured grant resource, information indicating the minimum duration T may be signaled through an RRC message or DCI (e.g., DCI for activation or reconfiguration of the configured grant resource).

Meanwhile, it may be difficult for the terminal to identify in which time period the HARQ-ACK information included in the DFI corresponds to the PUSCH. This problem will be described below.

Figure 13:
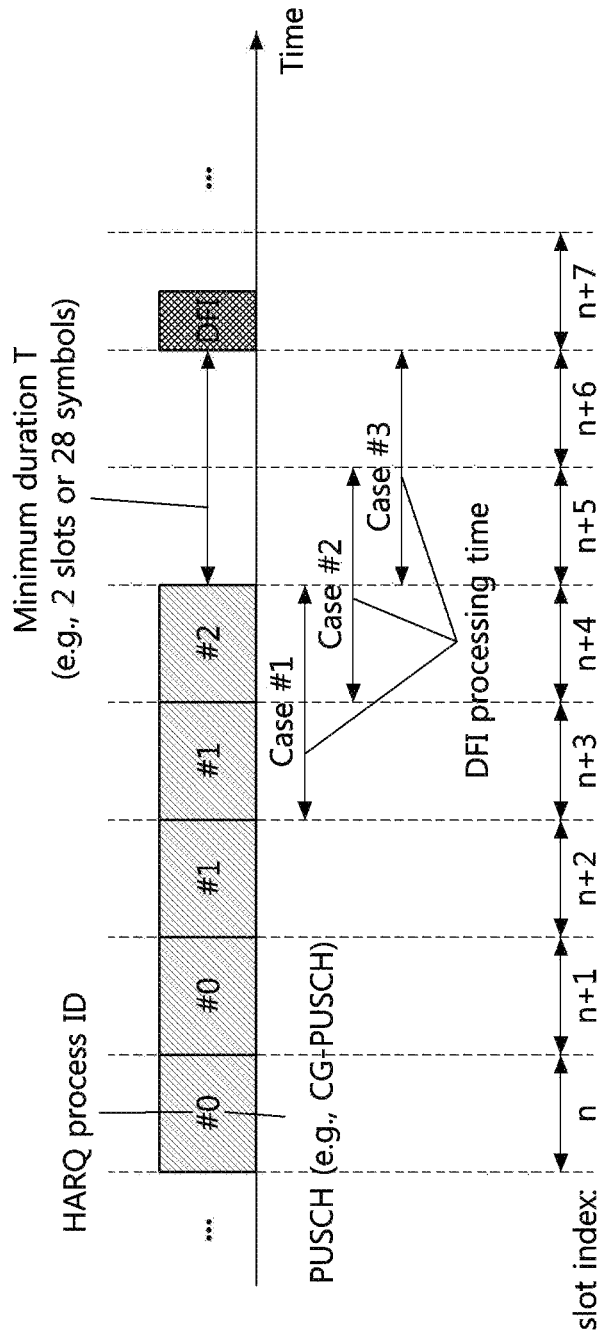
FIG. 13 is a conceptual diagram illustrating a first exemplary embodiment showing ambiguity in DFI interpretation.

FIG. 13 is a conceptual diagram illustrating a first exemplary embodiment showing ambiguity in DFI interpretation.

Referring to FIG. 13, the terminal may transmit a PUSCH(s) (e.g., configured grant PUSCH) in a time period from a slot n to a slot (n+4). Also, the terminal may receive DFI in a slot (n+7). The aforementioned slots may belong to a COT initiated by the terminal. Alternatively, the aforementioned slots may belong to a COT initiated by the base station. In a case #1, the base station may start an encoding operation of the DFI in the slot (n+3). In this case, the base station may reflect HARQ-ACK information (e.g., ACK or NACK) for the PUSCH(s) received in a time period from the slot n to the slot (n+2) in the DFI. HARQ-ACK information for the PUSCH(s) received in a time period of the slot (n+3) and the slot (n+4) may not be reflected in the corresponding DFI.

In a case #2, the base station may start an encoding operation of the DFI in the slot (n+4). In this case, the base station may reflect HARQ-ACK information for the PUSCH(s) received in a time period from the slot n to the slot (n+3) in the DFI. HARQ-ACK information for the PUSCH of the slot (n+4) may not be reflected in the corresponding DFI. In a case #3, the base station may start an encoding operation of the DFI in the slot (n+5). In this case, the base station may reflect HARQ-ACK information for all PUSCHs received in a time period from the slot n to the slot (n+4) in the DFI. The terminal may have difficulty in identifying when the DFI encoding operation is performed at the base station, and it may be difficult for the terminal to interpret specific HARQ-ACK information included in the DFI. For example, it may be difficult for the terminal to know whether the HARQ-ACK information for the HARQ process #1 reflects the PUSCH reception result in the slot (n+3), and it may be difficult for the terminal to know whether the HARQ-ACK information for the HARQ process #2 reflects the PUSCH reception result in the slot (n+4).

In order to solve this problem, a time window for the DFI (hereinafter referred to as a 'DFI window') may be defined. The DFI window may mean a time period in which PUSCH(s) associated with HARQ-ACK(s) reflected in the DFI are located. The DFI window may have a relative position from the transmission time point of the DFI. For example, an ending time point of the DFI window may be a time point before a preconfigured time period from a starting time point of the DFI. In addition, a starting time point of the DFI window may be a time point before a preconfigured time period from the starting time point of the DFI or the ending time point of the DFI window. The above-described time points (e.g., starting time point and ending time point) may be defined in units of slots. For example, the ending time point of the DFI window may be a time point before V slots from the starting time point of the slot in which the DFI is transmitted. Here, V may be a natural number.

Alternatively, the above-described time points (e.g., starting time point and ending time point) may be defined in units of symbols. For example, the ending time point of the DFI window may be a time point before W symbols from the first symbol in which the DFI is transmitted. Here, W may be a natural number. The DFI window may be predefined in the technical specification. Alternatively, the base station may configure the DFI window to the terminal. For example, in the type 1 configuration method of the configured grant resource, the DFI window may be indicated to the terminal by an RRC signaling procedure. In the type 2 configuration method of the configured grant resource, the DFI window may be indicated to the terminal by an RRC signaling procedure or a dynamic signaling procedure. In the dynamic signaling procedure, DCI (e.g., DCI for activation or reconfiguration of the configured grant resource) including information indicating the DFI window may be transmitted. The information indicating the DFI window may include one or more among the starting time point of the DFI window, an offset between the starting time point of the DFI window and the starting time point of the DFI, the ending time point of the DFI window, an offset between the ending time point of the DFI window and the starting time point of the DFI window, and the length of the DFI window.

The time distance (or, time gap) (e.g., V slots, W symbols) between the DFI window and the transmission time point of the DFI may be determined by the minimum duration T. Alternatively, the minimum duration T may be determined by the time distance between the DFI window and the transmission time point of the DFI. For example, the time distance between the DFI window and the transmission time point of the DFI may correspond to the minimum duration T. For another example, the time distance between the DFI window and the transmission time point of the DFI may be greater than or equal to the minimum duration T.

FIG. 14A is a conceptual diagram illustrating a first exemplary embodiment of a method for configuring a DFI window, and FIG. 14B is a conceptual diagram illustrating a second exemplary embodiment of a method for configuring a DFI window.

Referring to FIG. 14A, the terminal may transmit a PUSCH(s) (e.g., configured grant PUSCH) in a time period from a slot n to a slot (n+4), and receive DFI in a slot (n+7). An ending time point of the DFI window may be defined or configured as a time point before Tw (e.g., 2 slots or 28 symbols) from a starting time point of transmission of the DFI. The DFI window may be a time period from a slot m to the slot (n+4). The slot m may be a slot located before the slot n. In this case, the terminal may assume that the DFI includes HARQ-ACK information for PUSCH transmissions in a time period from the slot m to the slot (n+4).

Referring to FIG. 14B, the terminal may transmit a PUSCH(s) (e.g., configured grant PUSCH) in a time period from a slot n to a slot (n+4), and receive DFI in a slot (n+5). An ending time point of the DFI window may be defined or configured as a time point before $T_w$ (e.g., 2 slots or 28 symbols) from a starting time point of transmission of the DFI. The DFI window may be a time period from a slot m to the slot (n+2). The slot m may be a slot located before the slot n. In this case, the terminal may assume that the DFI includes HARQ-ACK information for PUSCH transmissions in a time period from the slot m to the slot (n+2).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
receiving information on one configured grant (CG) configuration for uplink transmission from a base station;
obtaining common time domain resource allocation information for combinations of resource block (RB) sets based on the information on the one CG configuration, the RB sets including a first RB set and a second RB set, the combinations including a first combination consisting of the first RB set, a second combination consisting of the second RB set, and a third combination consisting of the first and second RB sets;
obtaining first frequency domain resource allocation information for the first combination, second frequency domain resource allocation information for the second combination, and third frequency domain resource allocation information for the third combination based on the information on the one CG configuration;
determining one combination among the first, second, and third combinations;
determining a number of physical resource blocks (PRBs) to which an uplink channel is mapped based on one frequency domain resource allocation information corresponding to the one combination;
determining a transport block size (TBS) based on the common time domain resource allocation information and the number of PRBs; and
transmitting a transport block (TB) having the TBS to the base station within the one combination through the uplink channel according to the common time domain resource allocation information and the one frequency domain resource allocation information,
wherein the first frequency domain resource allocation information includes information indicating one or more interlaces applied to the first combination, the second frequency domain resource allocation information includes information indicating one or more interlaces applied to the second combination, and the third frequency domain resource allocation information includes information indicating one or more interlaces applied to the third combination.

2. The operation method according to claim 1, wherein the RB sets are located within a same bandwidth part.

3. The operation method according to claim 1, wherein each of the RB sets includes consecutive RBs in frequency domain.

4. The operation method according to claim 1, wherein a guard band is located between the RB sets, and the guard band disposed between RB sets constituting the one combination is used for transmission of the uplink channel.

5. The operation method according to claim 1, wherein the one combination is determined based on results of listen before talk (LBT) operations performed by the terminal in each of the first, second, and third combinations.

6. The operation method according to claim 1, wherein the RB sets are one or more RB sets among all RB sets constituting a same bandwidth part, and the information on the one CG configuration further includes information indicating the one or more RB sets or combinations of the one or more RB sets.

7. The operation method according to claim 1, wherein the information on the one CG configuration further includes information indicating a set of redundancy versions (RVs), and the TB is repeatedly transmitted according to the set of RVs.

8. The operation method according to claim 1, further comprising receiving hybrid automatic repeat request (HARQ)-acknowledgement (ACK) information from the base station, wherein the HARQ-ACK information includes a reception response for the TB transmitted within a time window, and the time window is determined based on a time point when the HARQ-ACK information is received.

9. An operation method of a base station in a communication system, the operation method comprising:
generating first frequency domain resource allocation information for a first combination consisting of a first resource block (RB) set, second frequency domain resource allocation information for a second combination consisting of a second RB set, and third frequency domain resource allocation information for a third combination consisting of the first and second RB sets;
transmitting information on one configured grant (CG) configuration including the first, second and third frequency domain resource allocation information to a terminal; and
receiving a transport block (TB) from the terminal through an uplink channel according to one frequency domain resource allocation information among the first, second and third frequency domain resource allocation information,
wherein the first frequency domain resource allocation information includes information indicating one or more interlaces applied to the first combination, the second frequency domain resource allocation information includes information indicating one or more interlaces applied to the second combination, the third frequency domain resource allocation information includes information indicating one or more interlaces applied to the third combination, and a size of the TB is determined based on a number of physical resource blocks (PRBs) corresponding to the one or more interlaces included in the one frequency domain resource allocation information.

10. The operation method according to claim 9, wherein the first and second RB sets are located within a same bandwidth part, and each of the first and second RB sets includes consecutive RBs in frequency domain.

11. The operation method according to claim 9, wherein the first and second RB sets exist in all RB sets constituting a same bandwidth part, and the information on the one CG configuration further includes information indicating the first and second RB sets or combinations of the first and second RB sets.

12. The operation method according to claim 9, wherein the information on the one CG configuration further includes common time domain resource allocation information indicating a set of redundancy versions (RVs), the TB is repeatedly transmitted by the terminal according to the set of RVs, and the common time domain resource allocation information is configured for the first, second, and third combinations.

13. The operation method according to claim 9, further comprising transmitting hybrid automatic repeat request (HARQ)-acknowledgement (ACK) information to the terminal, wherein the HARQ-ACK information includes a reception response for the TB received within a time window, and the time window is determined based on a time point when the HARQ-ACK is received at the terminal.

14. A terminal in a communication system, the terminal comprising:
a processor;
a memory electronically communicating with the processor; and
instructions stored in the memory,
wherein when executed by the processor, the instructions cause the terminal to:
receive information on one configured grant (CG) configuration for uplink transmission from a base station;
obtain common time domain resource allocation information for combinations of resource block (RB) sets based on the information on the one CG configuration, the RB sets including a first RB set and a second RB set, the combinations including a first combination consisting of the first RB set, a second combination consisting of the second RB set, and a third combination consisting of the first and second RB sets;
obtain first frequency domain resource allocation information for the first combination, second frequency domain resource allocation information for the second combination, and third frequency domain resource allocation information for the third combination based on the information on the one CG configuration;
determine one combination among the first, second, and third combinations;
determine a number of physical resource blocks (PRBs) to which an uplink channel is mapped based on one frequency domain resource allocation information corresponding to the one combination;
determine a transport block size (TBS) based on the common time domain resource allocation information and the number of PRBs; and
transmit a transport block (TB) having the TBS to the base station within the one combination through the uplink channel according to the common time domain resource allocation information and the one frequency domain resource allocation information,
wherein the first frequency domain resource allocation information includes information indicating one or more interlaces applied to the first combination, the second frequency domain resource allocation information includes information indicating one or more interlaces applied to the second combination, and the third frequency domain resource allocation information includes information indicating one or more interlaces applied to the third combination.

15. The terminal according to claim 14, wherein the RB sets are located within a same bandwidth part, and each of the RB sets includes consecutive RBs in frequency domain.

16. The terminal according to claim 14, wherein the RB sets are one or more RB sets among all RB sets constituting a same bandwidth part, and the information on the one CG configuration further includes information indicating the one or more RB sets or combinations of the one or more RB sets.

17. The terminal according to claim 14, wherein the information on the one CG configuration further includes information indicating a set of redundancy versions (RVs), the TB is repeatedly transmitted according to the set of RVs, and the common time domain resource allocation information is configured for the combinations of the RB sets.

18. The terminal according to claim 14, wherein the instructions further cause the terminal to receive hybrid automatic repeat request (HARQ)-acknowledgement (ACK) information from the base station, wherein the HARQ-ACK information includes a reception response for the TB transmitted within a time window, and the time window is determined based on a time point when the HARQ-ACK information is received.

* * * * *